(12) United States Patent
Huang

(10) Patent No.: US 12,190,016 B2
(45) Date of Patent: Jan. 7, 2025

(54) VIRTUAL AND REAL OBJECT RECORDING IN MIXED REALITY DEVICE

(71) Applicant: Magic Leap, Inc., Plantation, FL (US)

(72) Inventor: Ziqiang Huang, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/301,890

(22) Filed: Apr. 17, 2023

(65) Prior Publication Data

US 2023/0251823 A1 Aug. 10, 2023

Related U.S. Application Data

(63) Continuation of application No. 17/517,625, filed on Nov. 2, 2021, now Pat. No. 11,669,298, which is a
(Continued)

(51) Int. Cl.
*G06F 3/16* (2006.01)
*A63F 13/00* (2014.01)
(Continued)

(52) U.S. Cl.
CPC .............. *G06F 3/165* (2013.01); *A63F 13/00* (2013.01); *A63F 13/424* (2014.09); *A63F 13/5255* (2014.09); *A63F 13/5372* (2014.09); *A63F 13/54* (2014.09); *A63F 13/65* (2014.09); *G02B 27/0093* (2013.01); *G02B 27/0172* (2013.01);
(Continued)

(58) Field of Classification Search
CPC ............ G02B 27/0093; G02B 27/0172; A63F 13/424; A63F 13/5255; A63F 13/5372; A63F 13/54; A63F 13/65; A63F 13/00; G06F 3/165; G06F 3/04815; G06F 3/04842; G06F 3/012; G06F 3/017
See application file for complete search history.

(56) References Cited

U.S. PATENT DOCUMENTS

| 5,901,232 A | 5/1999 | Gibbs |
| 6,757,397 B1 | 6/2004 | Buecher et al. |

(Continued)

FOREIGN PATENT DOCUMENTS

| AU | 2022201783 B2 | 6/2023 |
| AU | 2022204210 B2 | 6/2023 |

(Continued)

OTHER PUBLICATIONS

Foreign OA for CN Patent Appln. No. 201880014388.7 dated Sep. 1, 2023.
(Continued)

*Primary Examiner* — Tadesse Hailu
(74) *Attorney, Agent, or Firm* — Vista IP Law Group, LLP

(57) ABSTRACT

A virtual image generation system for use by an end user comprises memory, a display subsystem, an object selection device configured for receiving input from the end user and persistently selecting at least one object in response to the end user input, and a control subsystem configured for rendering a plurality of image frames of a three-dimensional scene, conveying the image frames to the display subsystem, generating audio data originating from the at least one selected object, and for storing the audio data within the memory.

23 Claims, 19 Drawing Sheets

Related U.S. Application Data continuation of application No. 16/902,650, filed on Jun. 16, 2020, now Pat. No. 11,194,543, which is a continuation of application No. 15/907,115, filed on Feb. 27, 2018, now Pat. No. 10,725,729.

(60) Provisional application No. 62/464,757, filed on Feb. 28, 2017.

(51) Int. Cl.
| | |
|---|---|
| *A63F 13/424* | (2014.01) |
| *A63F 13/5255* | (2014.01) |
| *A63F 13/5372* | (2014.01) |
| *A63F 13/54* | (2014.01) |
| *A63F 13/65* | (2014.01) |
| *G02B 27/00* | (2006.01) |
| *G02B 27/01* | (2006.01) |
| *G06F 3/0481* | (2022.01) |
| *G06F 3/04815* | (2022.01) |
| *G06F 3/0484* | (2022.01) |
| *G06F 3/04842* | (2022.01) |
| *G06T 19/00* | (2011.01) |
| *H04R 1/32* | (2006.01) |
| *H04R 1/40* | (2006.01) |
| *G06F 3/01* | (2006.01) |
| *H04R 1/10* | (2006.01) |
| *H04R 3/00* | (2006.01) |
| *H04R 5/02* | (2006.01) |

(52) U.S. Cl.
CPC ...... *G06F 3/04815* (2013.01); *G06F 3/04842* (2013.01); *G06T 19/006* (2013.01); *H04R 1/32* (2013.01); *H04R 1/403* (2013.01); *G02B 2027/0138* (2013.01); *G02B 2027/014* (2013.01); *G06F 3/012* (2013.01); *G06F 3/017* (2013.01); *G06F 3/167* (2013.01); *G06T 2200/24* (2013.01); *H04R 1/1075* (2013.01); *H04R 3/005* (2013.01); *H04R 5/02* (2013.01); *H04S 2400/11* (2013.01)

(56) References Cited

U.S. PATENT DOCUMENTS

| | | | |
|---|---|---|---|
| 7,519,276 B2* | 4/2009 | Kim | H04N 5/9267 386/290 |
| 8,750,541 B1 | 6/2014 | Dong et al. | |
| 8,781,142 B2 | 7/2014 | Olafsson et al. | |
| 8,867,763 B2 | 10/2014 | Bouse | |
| 9,285,589 B2 | 3/2016 | Osterhout et al. | |
| 9,292,758 B2 | 3/2016 | Polo | |
| 9,310,559 B2 | 4/2016 | Macnamara | |
| 9,596,554 B2 | 3/2017 | Sherman | |
| 9,641,942 B2 | 5/2017 | Strelcyk et al. | |
| 9,671,566 B2 | 6/2017 | Abovitz et al. | |
| 9,703,369 B1 | 7/2017 | Mullen | |
| 9,848,260 B2 | 12/2017 | Conliffe | |
| 9,905,244 B2 | 2/2018 | Glasgow et al. | |
| 9,949,056 B2 | 4/2018 | Ranieri et al. | |
| 10,055,191 B2 | 8/2018 | Vennstrom et al. | |
| 10,206,042 B2 | 2/2019 | Hviid et al. | |
| 10,905,943 B2* | 2/2021 | Perry | A63F 13/34 |
| 11,498,282 B1 | 11/2022 | Walsh et al. | |
| 2002/0041695 A1 | 4/2002 | Luo | |
| 2002/0103649 A1 | 8/2002 | Basson et al. | |
| 2006/0008119 A1* | 1/2006 | Chang | G06T 7/74 382/103 |
| 2006/0092133 A1 | 5/2006 | Touma et al. | |
| 2007/0195012 A1 | 8/2007 | Ichikawa et al. | |
| 2008/0154946 A1 | 6/2008 | Chun et al. | |
| 2008/0231926 A1 | 9/2008 | Klug et al. | |
| 2008/0253575 A1 | 10/2008 | Lorgeoux et al. | |
| 2009/0128919 A1 | 5/2009 | Kim | |
| 2009/0174946 A1 | 7/2009 | Raviv et al. | |
| 2010/0074460 A1 | 3/2010 | Marzetta | |
| 2010/0184497 A1* | 7/2010 | Cichowlas | G10H 1/342 463/31 |
| 2011/0007277 A1 | 1/2011 | Solomon | |
| 2011/0107270 A1 | 5/2011 | Wang et al. | |
| 2011/0221659 A1 | 9/2011 | King et al. | |
| 2012/0075168 A1 | 3/2012 | Osterhout et al. | |
| 2012/0113140 A1 | 5/2012 | Hilliges et al. | |
| 2012/0127284 A1 | 5/2012 | Bar-Zeev et al. | |
| 2012/0162259 A1 | 6/2012 | Sakai | |
| 2012/0206452 A1 | 8/2012 | Geisner et al. | |
| 2012/0235886 A1 | 9/2012 | Border et al. | |
| 2012/0266087 A1 | 10/2012 | Edecker et al. | |
| 2013/0016379 A1 | 1/2013 | Lou et al. | |
| 2013/0123962 A1 | 5/2013 | Mizuta | |
| 2013/0222371 A1 | 8/2013 | Reitan | |
| 2013/0223660 A1 | 8/2013 | Olafsson et al. | |
| 2013/0278631 A1 | 10/2013 | Border et al. | |
| 2013/0328925 A1 | 12/2013 | Latta et al. | |
| 2014/0063061 A1 | 3/2014 | Reitan | |
| 2014/0067381 A1 | 3/2014 | Li et al. | |
| 2014/0146394 A1 | 5/2014 | Tout et al. | |
| 2014/0213279 A1 | 7/2014 | Hiltunen et al. | |
| 2014/0240351 A1 | 8/2014 | Scavezze et al. | |
| 2014/0267410 A1 | 9/2014 | Fein et al. | |
| 2014/0314391 A1 | 10/2014 | Kim et al. | |
| 2015/0035861 A1 | 2/2015 | Salter | |
| 2015/0036850 A1 | 2/2015 | Barthel | |
| 2015/0055808 A1 | 2/2015 | Vennstrom et al. | |
| 2015/0063603 A1 | 3/2015 | Henderek et al. | |
| 2015/0172814 A1 | 6/2015 | Usher et al. | |
| 2015/0195641 A1 | 7/2015 | Di Censo et al. | |
| 2015/0212576 A1 | 7/2015 | Ambrus | |
| 2015/0281833 A1 | 10/2015 | Shinenaga et al. | |
| 2015/0301787 A1 | 10/2015 | Greco | |
| 2015/0333717 A1 | 11/2015 | Pontoppidan et al. | |
| 2015/0341734 A1 | 11/2015 | Sherman | |
| 2015/0355805 A1 | 12/2015 | Chandler et al. | |
| 2016/0080874 A1 | 3/2016 | Fullam | |
| 2016/0088417 A1* | 3/2016 | Kim | H04S 1/005 381/17 |
| 2016/0093108 A1 | 3/2016 | Mao et al. | |
| 2016/0142830 A1 | 5/2016 | Hu | |
| 2016/0150064 A1 | 5/2016 | Norris et al. | |
| 2016/0196692 A1 | 7/2016 | Kjallstrom et al. | |
| 2017/0045941 A1 | 2/2017 | Tokubo et al. | |
| 2017/0086008 A1 | 3/2017 | Robinson | |
| 2017/0098453 A1 | 4/2017 | Wright | |
| 2017/0110142 A1 | 4/2017 | Fan et al. | |
| 2017/0195787 A1 | 7/2017 | Ichimura | |
| 2017/0208392 A1 | 7/2017 | Smithers et al. | |
| 2017/0223473 A1 | 8/2017 | Benattar | |
| 2017/0230760 A1 | 8/2017 | Sanger et al. | |
| 2017/0272627 A1 | 9/2017 | Henderek et al. | |
| 2017/0355805 A1 | 12/2017 | Yang et al. | |
| 2017/0364752 A1 | 12/2017 | Zhou et al. | |
| 2018/0008141 A1 | 1/2018 | Krueger | |
| 2018/0095542 A1* | 4/2018 | Mallinson | G06T 19/006 |
| 2018/0150275 A1 | 5/2018 | Mate | |
| 2018/0246698 A1 | 8/2018 | Huang et al. | |
| 2018/0349088 A1 | 12/2018 | Leppanen | |

FOREIGN PATENT DOCUMENTS

| | | |
|---|---|---|
| CN | 104065869 A | 9/2014 |
| CN | 105188516 A | 12/2015 |
| CN | 105323679 A | 2/2016 |
| CN | 110337318 | 10/2019 |
| JP | 08-298635 | 11/1996 |
| JP | 2004-258123 | 9/2004 |
| JP | 2004-267433 | 9/2004 |
| JP | 2012-008290 | 1/2012 |
| JP | 2012-029209 | 2/2012 |
| JP | 2012-503935 | 2/2012 |
| JP | 2013-162285 | 8/2013 |
| JP | 2015-019371 | 1/2015 |
| JP | 2015-198413 | 11/2015 |

(56) References Cited

FOREIGN PATENT DOCUMENTS

| JP | 2016-100677 | 5/2016 |
|---|---|---|
| JP | 2016-522463 | 7/2016 |
| KR | 10-2015-0118855 | 10/2015 |
| KR | 10-2016-0018436 | 2/2016 |
| KR | 10-2016-0079788 | 7/2016 |
| WO | WO 2013/188464 | 12/2013 |
| WO | WO 2014/164901 | 10/2014 |
| WO | WO 2015/103578 | 7/2015 |
| WO | WO 2015/170520 | 11/2015 |
| WO | WO 2016/071781 | 5/2016 |

OTHER PUBLICATIONS

Foreign NOA for KR Patent Appln. No. 10-2022-7023026 dated Sep. 15, 2023.
Extended European Search Report for EP Patent Appln. No. 23196831.4 dated Oct. 10, 2023.
Foreign NOA for IL Patent Appln. No. 301932 dated Nov. 29, 2023.
Foreign NOA for CA Patent Appln. No. 3007511 dated Mar. 31, 2023.
Final Office Action for U.S. Appl. No. 17/816,088 dated Apr. 21, 2023.
Extended European Search Report mailed Dec. 21, 2018 for European application No. 17748174.4, Applicant Magic Leap, Inc. 8 pages.
PCT International Search Report and Written Opinion for International Appln. No. PCT/US17/16263, Applicant Magic Leap, Inc., dated Jun. 5, 2017 (10 pages).
Restriction Requirement mailed Dec. 10, 2018 for U.S. Appl. No. 15/243,415.
Response to Restriction Requirement and Preliminary Amendment filed Feb. 4, 2019 for U.S. Appl. No. 15/243,415.
Non-Final Office Action dated Mar. 25, 2019 for U.S. Appl. No. 15/423,415.
Amendment Response to Non-Final Office Action dated Jun. 25, 2019 for U.S. Appl. No. 15/423,415.
Non-Final Office Action dated Feb. 26, 2019 for U.S. Appl. No. 15/907,115.
Amendment Response to Non-Final Office Action dated Jun. 26, 2019 for U.S. Appl. No. 15/907,115.
PCT International Search Report and Written Opinion for International Appln. No. PCT/US2018/020020, Applicant Magic Leap, Inc., Forms PCT/ISA/210, 220 and 237, dated May 10, 2018 (25 pages).
Response to Extended European Search Report filed Jul. 18, 2019 for European application No. 17748174.4, Applicant Magic Leap, Inc. 22 pages.
Notice of Allowance dated Sep. 4, 2019 for U.S. Appl. No. 15/423,415.
Amendment after allowance filed Oct. 31, 2019 for U.S. Appl. No. 15/423,415.
Final Office Action dated Nov. 12, 2019 for U.S. Appl. No. 15/907,115.
Examination Report dated Oct. 28, 2019 for European application No. 17748174.4, Applicant Magic Leap, Inc. 6 pages.
Amendment/RCE Response to Office Action dated Feb. 12, 2020 for U.S. Appl. No. 15/907,115.
Extended European Search Report mailed Feb. 14, 2020 for European application No. 18760949.0, Applicant Magic Leap, Inc. 12 pages.
Response to Examination Report filed Mar. 9, 2020 for European application No. 17748174.4, Applicant Magic Leap, Inc. 13 pages.
Notice of Allowance dated Mar. 16, 2020 for U.S. Appl. No. 15/907,115.
Foreign Office Action for Israeli Patent Application No. 260113 dated Mar. 15, 2020.
Foreign Office Action Response for Israeli Patent Application No. 260113 dated Jul. 13, 2020.
2nd Examination Report for EP Patent Appln. No. 17748174.4 dated Jul. 17, 2020.
Response to EESR for EP Patent Appln. No. 18760949.0 dated Sep. 14, 2020.
Foreign Response for EP Patent Appln. No. 17748174.4 dated Nov. 17, 2020.
Foreign OA for CN Patent Appln. No. 201780009744.1 dated Jan. 6, 2021.
Foreign 1st Exam Report for AU Patent Appln. No. 2017215349 dated Jan. 12, 2021.
Foreign OA for JP Patent Appln. No. 2018-539378 dated Feb. 24, 2021.
Foreign NOA for IL Patent Appln. No. 260113 dated Mar. 18, 2021.
Foreign OA for KR Patent Appln. No. 10-2019-7028175 dated Mar. 22, 2021.
Foreign OA for JP Patent Appln. No. 2019-546368 dated Mar. 29, 2021.
Foreign Exam Report for AU Patent Appln. No. 2018227710 dated Mar. 31, 2021.
Foreign OA for JP Patent Appln. No. 2020-24915 dated Apr. 7, 2021.
Foreign Response for CN Patent Appln. No. 201780009744.1 dated Apr. 27, 2021.
Foreign Response for JP Patent Appln. No. 2018-539378 dated May 17, 2021.
Foreign Resonse for KR Patent Appln. No. 10-2019-7028175 dated May 21, 2021.
Foreign NOA for JP Patent Appln. No. 2018-539378 dated May 26, 2021.
Foreign Response to JP Patent Appln. No. 2019-546368 dated Jun. 16, 2021.
Foreign Response for JP Patent Appln. No. 2020-24915 dated Jul. 6, 2021.
Foreign NOA for KR Patent Appln. No. 10-2019-7028175 dated Jun. 28, 2021.
Non-Final Office Action for U.S. Appl. No. 16/698,794 dated Jul. 14, 2021.
Foreign Summons Proceedings for EP Patent Appln. No. 17748174.4 dated Jul. 1, 2021.
Notice of Allowance for U.S. Appl. No. 16/902,650 dated Jul. 22, 2021.
Foreign OA for CN Patent Appln. No. 201780009744.1 dated Jul. 28, 2021.
Foreign NOA for JP Patent Appln. No. 2019-546368 dated Sep. 13, 2021.
Foreign Resonse for CN Patent Appln. No. 201780009744.1 dated Sep. 22, 2021.
Amendment Response to NFOA for U.S. Appl. No. 16/698,794 dated Oct. 12, 2021.
Foreign NOA for IL Patent Appln. No. 268397 dated Aug. 15, 2021.
Foreign NOA for CN Patent Appln. No. 201780009744.1 dated Oct. 13, 2021.
Foreign OA for KR Patent Appln. No. 10-2021-7031142 dated Oct. 28, 2021.
Foreign OA for IN Patent Appln. No. 201847031684 dated Oct. 26, 2021.
Foreign Response for AU Patent Appln. No. 2017215349 dated Nov. 24, 2021.
Foreig OA for JP Patent Appln. No. 2020-24915 dated Nov. 17, 2021.
Foreign Response for KR Patent Appln. No. 10-2021-7031142 dated Dec. 28, 2021.
Foreign Exam Report for IN Patent Appln. No. 201947036129 dated Jan. 14, 2022.
Final Office Action for U.S. Appl. No. 16/698,794 dated Jan. 21, 2022.
Foreign FOA for KR Patent Appln. No. 10-2021-7031142 dated Feb. 8, 2022 (with English translation).
Foreign Response for AU Patent Appln. No. 2018227710 dated Feb. 11, 2022.
Foreign Response for KR Patent Appln. No. 10-2021-7031142 dated Mar. 11, 2022.

(56) References Cited

OTHER PUBLICATIONS

Foreign Exam Report for EP Patent Appln. No. 18760949.0 dated Feb. 23, 2022.
Foreign Exam Report for NZ Patent Appln. No. 743729 dated Mar. 28, 2022.
Foreign NOA for KR Patent Appln. No. 10-2019-7031142 dated Apr. 5, 2022.
Amendment After Final for U.S. Appl. No. 16/698,794 dated Apr. 19, 2022.
Notice of Allowance for U.S. Appl. No. 16/698,794 dated Apr. 29, 2022.
Foreign Decision to Grant for EP Patent Appln. No. 17748174.4 dated Jun. 17, 2022.
Foreign Response for EP Patent Appln. No. 18760949.0 dated Jul. 5, 2022.
Foreign Exam Report for AU Patent Appln. No. 2022204210 dated Jul. 7, 2022.
Foreign Response for IN Patent Appln. No. 201847031684 dated Jul. 23, 2022 in English.
Foreign First Official Notification for IL Patent Appln. No. 283975 dated Jul. 11, 2022 in English.
Foreign Exam Report for AU Patent Appln. No. 2022201783 dated Jul. 21, 2022.
Extended European Search Report for EP Patent Appln. No. 22176653.8 dated Sep. 7, 2022.
Non-Final Office Action for U.S. Appl. No. 17/517,625 dated Sep. 21, 2022.
Foreign Response to NZ Patent Appln. No. 743729 dated Sep. 28, 2022.
Foreign OA for JP Patent Appln. No. 2021-167529 dated Sep. 27, 2022 (with English translation).
Foreign Notice of Acceptance for NZ Patent Appln. No. 743729 dated Oct. 18, 2022.
Non-Final Office Action for U.S. Appl. No. 17/816,088 dated Nov. 23, 2022.
Foreign Response for IL Patent Appln. No. 283975 dated Nov. 30, 2022.
Foreign NOA for IL Patent Appln. No. 288137 dated Nov. 27, 2022 in English.
Amendment Response to NFOA for U.S. Appl. No. 17/517,625 dated Dec. 20, 2022.
Foreign Response for JP Patent Appln. No. 2021-167529 dated Dec. 26, 2022.
Notice of Allowance for U.S. Appl. No. 17/517,625 dated Jan. 25, 2023.
Amendment Response to NFOA for U.S. Appl. No. 17/816,088 dated Feb. 22, 2023.
Foreign OA for KR Patent Appln. No. 10-2022-7023026 dated Mar. 20, 2023.
Foreign OA for CN Patent Appln. No. 201880014388.7 dated Mar. 1, 2023.
Foreign NOA for JP Patent Appln. No. 2021-167529 dated Apr. 4, 2023.
Foreign Intent to Grant for EP Patent Appln. No. 18760949.0 dated Mar. 24, 2023.
Foreign NOA for IL Patent Appln. No. 283975 dated Jun. 27, 2023.
Foreign Response for CN Patent Appln. No. 201880014388.7 dated Nov. 2, 2023.
Foreign Notice of Acceptance for AU Patent Appln. No. 2022204210 dated Jun. 15, 2023.
Foreign OA for CN Patent Appln. No. 202111504258.1 dated Jun. 28, 2023.
Foreign Notice of Acceptance for AU Patent Appln. No. 2022201783 dated Jun. 14, 2023.
Notice of Allowance for U.S. Appl. No. 17/816,088 dated Jul. 6, 2023.
Foreign Response for KR Patent Appln. No. 10-2022-7023026 dated May 17, 2023.
Foreign Exam Report for NZ Patent Appln. No. 784781 dated Aug. 31, 2023.
Foreign NOA for CA Patent Appln. No. 3206524 dated Sep. 12, 2023.
Foreign Response for CN Patent Appln. No. 202111504258.1 dated Oct. 12, 2023.
Foreign NOA for CN Patent Appln. No. 202111504258.1 dated Jan. 5, 2024.
Foreign OA for KR Patent Appln. No. 10-2022-7023026 dated Mar. 20, 2023 (with English translation).
Foreign OA for CN Patent Appln. No. 201880014388.7 dated Mar. 1, 2023 (with English translation).
Foreign Response to EESR for EP patent Appln. No. 22176653.8 dated Apr. 19, 2023.
Foreign Response for AU Patent Appln. No. 2022201783 dated May 26, 2023.
Foreign Response for AU Patent Appln. No. 2022204210 dated May 22, 2023.
Foreign Response for CN Patent Appln. No. 201880014388.7 dated Jun. 13, 2023.
Amendment After Final for U.S. Appl. No. 17/816,088 dated Jun. 19, 2023.
Foreign Response for KR Patent Appln. No. 10-2018-7022403 dated Jun. 5, 2024.
Foreign OA for JP Patent Appln. No. 2023-76101 dated May 16, 2024 (with English translation).
Foreign Response for CN Patent Appln. No. 201880014388.7 dated Mar. 20, 2024.
Foreign NOA for IL Patent Appln. No. 307306 dated Mar. 3, 2024 in English.
Foreign NOA for CN Patent Appln. No. 201880014388.7 dated Mar. 29, 2024.
Foreign OA for KR Patent Appln. No. 10-2018-7022403 dated Apr. 9, 2024 (with English translation).
Foreign Response for EP Patent Appln. No. 23196831.4 dated May 7, 2024.
Foreign OA for CN Patent Appln. No. 201880014388.7 dated Jan. 31, 2024.
Foreign OA Response for IN Patent Appln. No. 201847031684 dated Feb. 1, 2024 in English.
Foreign Response for JP Patent Appln. No. 2023-76101 dated Jul. 30, 2024.
Foreign OA for KR Patent Appln. No. 10-2023-7043530 dated Sep. 2, 2024.
Foreign NOA for JP Patent Appln. No. 2023-76101 dated Sep. 25, 2024.
Foreign OA Translation for KR Patent Appln. No. 10-2023-7043530 dated Oct. 2, 2024.

\* cited by examiner

VIRTUAL AND REAL OBJECT RECORDING IN MIXED REALITY DEVICE

CROSS-REFERENCE TO RELATED APPLICATION(S)

The present disclosure is a continuation of pending U.S. patent application Ser. No. 17/517,625, filed on Nov. 2, 2021, and entitled "VIRTUAL AND REAL OBJECT RECORDING IN MIXED REALITY DEVICE", which is a continuation of U.S. patent application Ser. No. 16/902,650, filed on Jun. 16, 2020, now U.S. Pat. No. 11,194,543, and entitled "VIRTUAL AND REAL OBJECT RECORDING IN MIXED REALITY DEVICE", which is a continuation of U.S. patent application Ser. No. 15/907,115, filed on Feb. 27, 2018, now U.S. Pat. No. 10,725,729 and entitled "VIRTUAL AND REAL OBJECT RECORDING IN MIXED REALITY DEVICE", which claims priority to U.S. Provisional Patent Application Ser. No. 62/464,757, filed on Feb. 28, 2017, and entitled "VIRTUAL AND REAL OBJECT RECORDING IN MIXED REALITY DEVICE". The contents of the aforementioned U.S. patents, U.S. patent applications, and U.S. provisional patent applications are hereby explicitly and fully incorporated by reference in their entireties for all purposes, as though set forth in the present disclosure in full.

FIELD OF THE INVENTION

The present invention generally relates to virtual reality and augmented reality systems.

BACKGROUND

Modern computing and display technologies have facilitated the development of mixed reality systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to actual real-world visual input. An augmented reality, or "AR", scenario typically involves presentation of digital or virtual image information as an augmentation to visualization of the actual world around the user (i.e., transparency to other actual real-world visual input). Accordingly, AR scenarios involve presentation of digital or virtual image information with transparency to other actual real-world visual input.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display system, the data being displayed can be updated to take the change in head pose (i.e., the orientation and/or location of user's head) into account. Head-worn displays that enable AR (i.e., the concurrent viewing of virtual and real objects) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display system to view directly the light from real objects in the environment. The transparent element, often referred to as a "combiner," superimposes light from the display over the end user's view of the real world.

Oftentimes, a user of a VR/AR system may want to share his or her experience with others (e.g., when playing a game, teleconferencing, or watching a movie) by recording and saving the experience on the VR/AR system for subsequent publishing on-line. However, there may typically be noise and other unwanted or unexpected sounds in the recording due to a noisy environment or there may otherwise be too many sources of sound that cause distractions to the experience. Such unwanted/unexpected sounds may originate from real objects, e.g., from children playing in the vicinity the VR/AR system, or from virtual objects, e.g., from a virtual television playing in the context of the VR/AR system.

There, thus, remains a need to provide a simple and efficient means for recording sounds from only virtual or real objects that the user is interested in.

SUMMARY

In accordance with a first aspect of the present inventions, a virtual image generation system for use by an end user comprises memory, a display subsystem, and an object selection device configured for receiving input from the end user and persistently selecting at least one object (e.g., a real object and/or a virtual object) in response to the end user input. In one embodiment, the display subsystem has a field of view, and the object selection device is configured for persistently selecting the object(s) in the field of view. In this case, the object selection device may be configured for moving a three-dimensional cursor in the field of view of the display subsystem and selecting the object(s) in response to receiving the end user input. In another embodiment, the end user input comprises one or more voice commands, and wherein the object selection device comprises one or more microphones configured for sensing the voice command(s). In still another embodiment, the end user input comprises one or more hand gestures, in which case, the object selection device may comprise one or more cameras configured for sensing the hand gesture(s).

In the case where a plurality of objects is selected, the object selection device may be configured for individually selecting and/or globally selecting the objects in response to the end user input. If globally selected, the object selection device may be configured for globally selecting all objects in an angular range of the field of view (which may be less than the entire angular range of the field of view or may be the entire angular range of the field of view) in response to the end user input. In one embodiment, the object selection device is further configured for receiving another input from the end user and persistently deselecting the previously selected object(s) in response to the other end user input.

The virtual image generation system further comprises a control subsystem configured for generating video data originating from the at least one selected object, rendering a plurality of image frames in a three-dimensional scene from the video data, and conveying the image frames to the display subsystem. In one embodiment, the display subsystem is configured for being positioned in front of the eyes of the end user. In another embodiment, the display subsystem includes a projection subsystem and a partially transparent display surface. In this case, the projection subsystem may be configured for projecting the image frames onto the partially transparent display surface, and the partially transparent display surface may be configured for being positioned in the field of view between the eyes of the end user and an ambient environment. The virtual image generation system may further comprise a frame structure configured for being worn by the end user, and carrying at least a portion of the display subsystem.

The control subsystem is further configured for generating audio data originating from the selected object(s), and for storing the audio data within the memory. The virtual image generation system may further comprise a plurality of speakers, in which case, the control subsystem may be further configured for conveying the generated audio data to the speakers. In an optional embodiment, the control subsystem is further configured for storing the video data in synchronization with the audio data in the memory. In still another embodiment, the virtual image generation system further comprises at least one sensor configured for tracking a location of the selected object(s) relative to the field of view of the display subsystem. In this case, the control subsystem may be configured for ceasing to store the audio data in the memory when the tracked location of the selected object(s) moves out of the field of view of the display subsystem, or alternatively, is configured for continuing to store the audio data in the memory when the tracked location of the selected object(s) moves out of the field of view of the display subsystem.

If the selected object(s) comprises a real object, the virtual image generation system may further comprise a microphone assembly configured for generating an audio output, in which case, the control subsystem may be further configured for modifying the direction audio output to preferentially sense sounds originating from the selected real object. The audio data may be derived from the modified audio output. The virtual image generation system may further comprise one or more cameras configured for capturing video data originating from the selected real object, in which case, the control subsystem may be further configured for storing the video data in synchronization with the audio data in the memory. The control subsystem may be configured for transforming the captured video data into virtual content data for the selected real object, and storing the virtual content in the memory.

If the selected object(s) comprises a virtual object, the virtual image generation system may further comprise a database configured for storing content data corresponding to sounds for a plurality of virtual objects, in which case, the control subsystem may be further configured for acquiring the content data corresponding to the selected virtual object from the database, and the audio data stored in the memory comprises the acquired content data. The control subsystem may be further configured for generating meta data corresponding to the selected virtual object (e.g., position, orientation, and volume data for the selected virtual object), in which case, the audio data stored in the memory may comprise the acquired content data and generated meta data. In one embodiment, the virtual image generation system further comprises one or more sensors configured for tracking a head pose of the end user, in which case, the database may be configured for storing absolute meta data for the plurality of virtual objects, and the control subsystem may be further configured for generating the meta data by acquiring the absolute meta data corresponding to the selected virtual object, and localizing the absolute meta data to the end user based on the tracked head pose of the end user.

The virtual image generation system may further comprise at least one speaker, in which case, the control subsystem may be further configured for retrieving the stored audio data from the memory, deriving audio from the retrieved audio data, and conveying the audio to the speaker(s). The audio data stored in the memory may comprise content data and meta data, in which case, the control subsystem may be further configured for retrieving the stored content data and meta data from the memory, rendering spatialized audio based on the retrieved content data and meta data, and the conveying the rendered spatialized audio to the at speaker(s).

In accordance with a second aspect of the present inventions, a method of operating a virtual image generation system by an end user is provided. The method comprises persistently selecting at least one object (e.g., a real object and/or a virtual object). In one method, selecting the object(s) comprises moving a three-dimensional cursor in the field of view of the end user and selecting the object(s) with the three-dimensional cursor. In another method, selecting the object(s) comprises issuing one or more voice command. In still another method, selecting the at least one object comprises making one or more hand gestures. If a plurality of objects is selected, selecting the plurality of objects may comprise individually selecting the objects and/or globally selecting the objects. If globally selected, the objects may be selected by defining an angular range of a field of view of the end user (which may be less than the entire angular range of the field of view or may be the entire angular range of the field of view), and selecting all of the objects in the defined angular range of the field of view of the end user. An optional method may further comprise persistently deselecting the previously selected object(s).

The method further comprises generating video data originating from the selected object(s), rendering a plurality of images frames in a three-dimensional scene from the generated video data, and displaying the image frames to the end user, generating audio data originating from the at least one selected object, and storing the audio data originating from the at least one selected object within memory. One method may further comprise transforming the audio data originating from the selected object(s) into sound for perception by the end user. The method may optionally comprise storing the video data in synchronization with the audio data in the memory. Still another method may further comprise tracking a location of the selected object(s) relative to a field of view of the end user. In this case, method may further comprise ceasing to store the audio data in the memory when the tracked location of the selected object(s) moves out of the field of view of the end user, or alternatively, continuing to store the audio data in the memory when the tracked location of the selected object(s) moves out of the field of view of the end user.

If the selected object(s) comprises a real object, the method may further comprise preferentially sensing sounds originating from the selected real object relative to sounds originating from other real objects, in which case, the audio data may be derived from the preferentially sensed sounds. The method may further comprise capturing video data originating from the selected real object, and storing the video data in synchronization with the audio data in the memory. The captured video data may be transformed into virtual content data for storage in the memory.

If the selected object(s) comprises a virtual object, the method may further comprise storing content data corresponding to sounds for a plurality of virtual objects, and acquiring the content data corresponding to the selected virtual object, in which case, the audio data stored in the memory may comprise the acquired content data. The method may further comprise generating meta data corresponding to the selected virtual object (e.g., position, orientation and volume data for the selected virtual object), in which case, the audio data stored in the memory may comprise the acquired content data and the generated meta data. The method may further comprise tracking a head pose of the end user, and storing absolute meta data for the plurality of virtual objects. In this case, generating the meta data may comprise retrieving the absolute meta data corresponding to the selected virtual object, and localizing the absolute meta data to the end user based on the tracked head pose of the end user.

The method may further comprise retrieving the stored audio data, deriving audio from the retrieved audio data, and transforming the audio into sound for perception by the end user. The stored audio data may comprise content data and meta data, in which case, the method may further comprise retrieving the stored content data and meta data from the memory, rendering spatialized audio based on the retrieved content data and meta data, and transforming the spatialized audio into sound for perception by the end user.

In accordance with a third aspect of the present inventions, a virtual image generation system for use by a playback user is provided. The virtual image generation system comprises memory configured for storing audio content data and video content data originating from at least one object (e.g., a real object and/or a virtual object) in an original spatial environment, a plurality of speakers, and a display subsystem. In one embodiment, the display subsystem is configured for being positioned in front of the eyes of the end user. In another embodiment, the display subsystem includes a projection subsystem and a partially transparent display surface. In this case, the projection subsystem may be configured for projecting the image frames onto the partially transparent display surface, and the partially transparent display surface may be configured for being positioned in the field of view between the eyes of the end user and an ambient environment. The virtual image generation system may further comprise a frame structure configured for being worn by the end user, and carrying at least a portion of the display subsystem.

The virtual image generation system further comprises a control subsystem configured for retrieving the audio content data and video content data from the memory, respectively rendering audio and video from the retrieved audio content data and video content data in a new spatial environment different from the original spatial environment, and synchronously conveying the rendered audio to the speakers and the generated video data to the display subsystem.

In one embodiment, the control subsystem is configured for storing the audio content data and video content data in the memory. The virtual image generation system may further comprise an object selection device configured for receiving input from an end user and persistently selecting the object(s) in the original spatial environment in response to the end user input prior to storage of the audio content data and video content data in the memory.

If the object(s) comprises a real object, the virtual image generation system may further comprise a microphone assembly configured for capturing the audio content data from the real object in the original spatial environment. The microphone assembly may be configured for generating an audio output, in which case, the control subsystem may be further configured for modifying the direction the audio output to preferentially sense sounds originating from the selected real object. The audio content data may be derived from the modified audio output. The virtual image generation system may further comprise one or more cameras configured for capturing the video data from the selected real object in the original spatial environment. In an optional embodiment, the control subsystem may be configured for transforming the captured video data into virtual content data for the selected real object, and storing the virtual content data as the video content data in the memory.

If the object(s) comprises a virtual object, the virtual image generation system may further comprise a database configured for storing content data corresponding to sounds for a plurality of virtual objects, in which case, the control subsystem may be further configured for acquiring the content data corresponding to the virtual object from the database, and the audio data stored in the memory may comprise the acquired content data.

In one embodiment, the control subsystem is configured for acquiring absolute meta data corresponding to the at least one object in the new spatial environment, and rendering the audio from the retrieved audio content data and the absolute meta data in the new spatial environment. Acquiring the absolute meta data corresponding to the object(s) in the new spatial environment may comprise positioning the object(s) in the new spatial environment. In this case, the virtual image generation system may further comprise a user input device configured for receiving input from the playback user, in which case, the control subsystem may be configured for positioning the object(s) in the new spatial environment in response to the input from the playback user. The virtual image generation system may further comprise one or more sensors configured for tracking a head pose of the playback user, in which case, the control subsystem may be further configured for localizing the absolute meta data to the playback user based on the tracked head pose of the playback user, such that the rendered audio is spatialized.

In accordance with a fourth aspect of the present inventions, a method of operating a virtual image generation system by a playback user to play back audio and video of at least one object (e.g., a real object and/or virtual object) previously recorded in an original spatial environment as audio content data and video content data is provided. The method comprises retrieving the audio content data and video content data from memory. One method further comprises storing the audio content data and video content data in the memory. In this case, the method may further comprise persistently selecting the object(s) in the original spatial environment prior to storage of the audio content data and video content data in the memory.

If the object comprises a real object, the method may further comprise capturing the audio content data from the real object. In this case, the method may further comprise preferentially sensing sounds originating from the selected real object relative to sounds originating from other real objects. The audio content data is derived from the preferentially sensed sounds. The method may further comprise capturing video data from the selected real object, and transforming the captured video data into the virtual content data. If the object comprises a virtual object, the method may further comprise storing content data corresponding to sounds for a plurality of virtual objects, and acquiring the content data corresponding to the virtual object from the database. The audio content data stored in the memory may comprise the acquired content data.

The method further comprises respectively rendering audio and video from the retrieved audio content data and video content data in a new spatial environment different from the original spatial environment, respectively transforming the audio and video into sound and image frames, and synchronously conveying the sound and image frames to the playback user. One method further comprises acquiring absolute meta data corresponding to the object(s) in the new spatial environment, in which case, the audio is rendered from the retrieved audio content data and the absolute meta data in the new spatial environment. The method may further comprise tracking a head pose of the playback user, and localizing the absolute meta data to the playback user based on the tracked head pose of the playback user, in which case, the audio may be rendered from the retrieved audio content data and the localized meta data in the new spatial environment, such that the rendered audio is spatialized. Acquiring the absolute meta data corresponding to the object(s) in the new spatial environment may comprise positioning the object(s) in the new spatial environment, e.g., in response to the input from the playback user.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
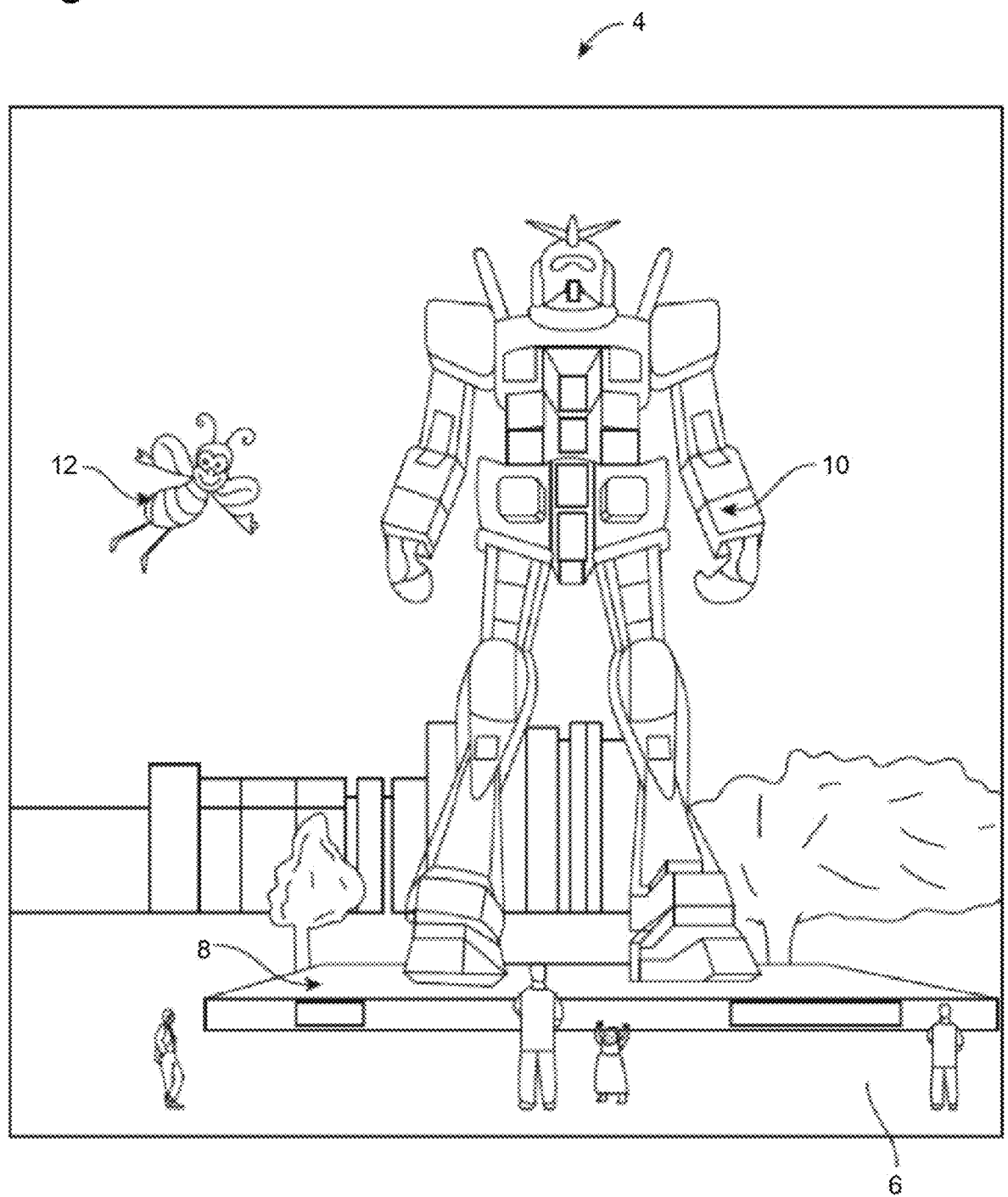
FIG. 1 is a picture of a three-dimensional augmented reality scene that can be displayed to an end user by a prior art augmented reality generation device.

The description that follows relates to display systems and methods to be used in an augmented reality system. However, it is to be understood that while the invention lends itself well to applications in augmented reality systems, the invention, in its broadest aspects, may not be so limited. For example, the invention can be applied to virtual reality systems. Thus, while often described herein in terms of an augmented reality system, the teachings should not be limited to such systems of such uses. The augmented reality system may be operated in the context of, e.g., a video game, a teleconference with a combination of virtual and real persons, or watching a movie.

The augmented reality system described herein allows an end user to record audio data originating from at least one object (either virtual or real) persistently selected by the end user. Such recorded audio data can be subsequently played back by the same or different end user. The sound originating from the recorded audio data may be played back to the same or different end user in the real environment in which the audio data was originally recorded. In addition to recording the content of the audio data, meta data characterizing the environment in which the audio content was originally recorded, as well as the head pose of the end user, may be recorded in association with such audio data, so that during playback, audio may be re-rendered and transformed into spatialized sound that is auditorily experienced in the same manner in which the end user auditorily experienced the spatialized sound during the original recording. Optionally, audio may be re-rendered and transformed into spatialized sound for perception by the same or different end user in a new virtual or real environment, so that the same or different end user may have an auditory experience that is appropriate for the new environment. The audio data may be recorded in synchrony with video data originating from virtual objects and real objects in the ambient environment.

The augmented reality system described herein may be operated to provide images of virtual objects intermixed with real (or physical) objects in a field of view of an end user, as well as providing virtual sound originating from virtual sources (either inside or outside the field of view) intermixed with real sound originating from real (or physical) sources (either inside or outside the field of view). To this end, one embodiment of an augmented reality system 100 constructed in accordance with present inventions will now be described with reference to FIGS. 2 and 3. The augmented reality system 100 comprises a display subsystem 102, which includes a display screen 104 and a projection subsystem (not shown) that projects images onto the display screen 104.

In the illustrated embodiment, the display screen 104 is a partially transparent display screen through which real objects in the ambient environment can be seen by the end user 50 and onto which images of virtual objects may be displayed. The augmented reality system 100 further comprises a frame structure 106 worn by an end user 50 that carries the partially transparent display screen 104, such that the display screen 104 is positioned in front of the eyes 52 of the end user 50, and in particular in the end user's 50 field of view between the eyes 52 of the end user 50 and the ambient environment.

The display subsystem 102 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display subsystem 102 presents a sequence of frames at high frequency that provides the perception of a single coherent scene.

In alternative embodiments, the augmented reality system 100 may employ one or more imagers (e.g., cameras) to capture and transform images of the ambient environment into video data, which can then be inter-mixed with video data representing the virtual objects, in which case, the augmented reality system 100 may display images representative the intermixed video data to the end user 50 on an opaque display surface.

Further details describing display subsystems are provided in U.S. Provisional patent application Ser. No. 14/212,961, entitled "Display Subsystem and Method," and U.S. Provisional patent application Ser. No. 14/331,216, entitled "Planar Waveguide Apparatus With Diffraction Element(s) and Subsystem Employing Same," which are expressly incorporated herein by reference.

The augmented reality system 100 further comprises one or more speaker(s) 108 for presenting sound only from virtual objects to the end user 50, while allowing the end user 50 to directly hear sound from real objects. In alternative embodiments, the augmented reality system 100 may comprise one or more microphones (not shown) to capture and transform real sound originating from the ambient environment into audio data, which can be inter-mixed with the audio data from virtual sound, in which case, the speaker(s) 108 may convey sound representative of the intermixed audio data to the end user 50.

Figure 4:
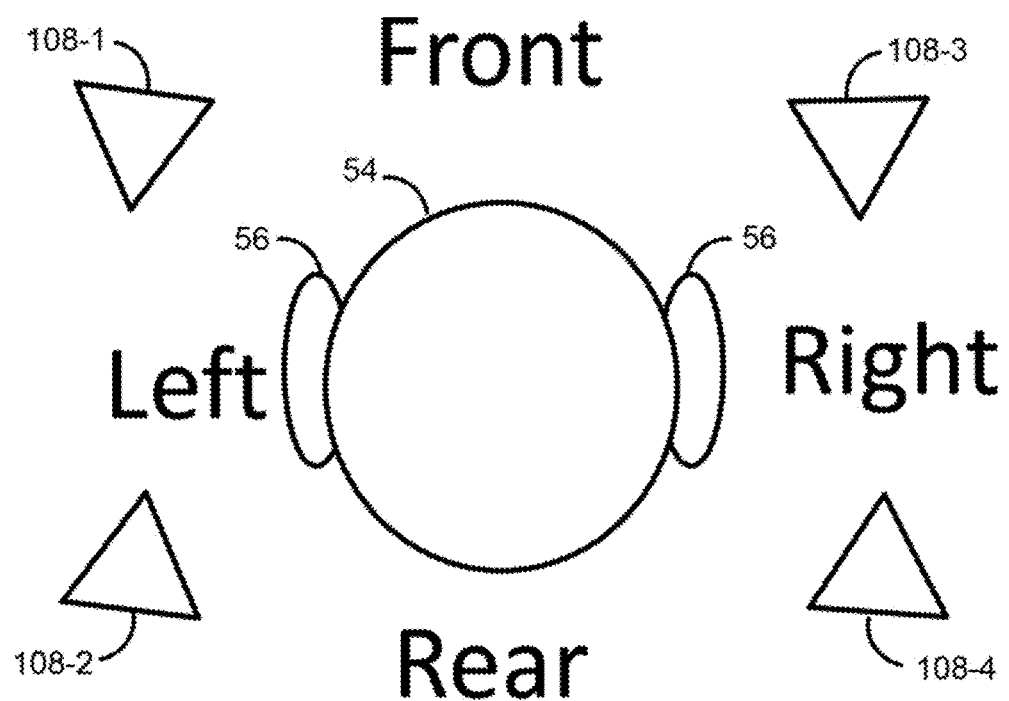
FIG. 4 is a plan view of one embodiment of a spatialized speaker system used in the augmented reality system of FIG. 2.

In any event, the speaker(s) 108 are carried by the frame structure 106, such that the speaker(s) 108 are positioned adjacent (in or around) the ear canals of the end user 50, e.g., earbuds or headphone. The speaker(s) 108 may provide for stereo/shapeable sound control. Although the speaker(s) 108 are described as being positioned adjacent the ear canals, other types of speakers that are not located adjacent the ear canals can be used to convey sound to the end user 50. For example, speakers may be placed at a distance from the ear canals, e.g., using a bone conduction technology. In an optional embodiment illustrated in FIG. 4, multiple spatialized speakers 108 may be located about the head 54 of the end user 50 (e.g., four speakers 108-1, 108-2, 108-3, and 108-4) and be configured for receiving sound from the left, right, front, and rear of the head 54 and pointed towards the left and right ears 56 of the end user 50. Further details on spatialized speakers that can be used for augmented reality system are described in U.S. Provisional Patent Application Ser. No. 62/369,561, entitled "Mixed Reality System with Spatialized Audio," which is expressly incorporated herein by reference.

Significantly, the augmented reality system 100 is configured for allowing the end user 50 to select one, a few, or all objects (either virtual or real) for recordation of sounds only from these selected object(s). To this end, the augmented reality system 100 further comprises an object selection device 110 configured for selecting one or more real objects (i.e., real objects from which real sound originates) and virtual objects (i.e., virtual objects from which virtual sound originates) for recording sounds therefrom in response to input from the end user 50. The object selection device 110 may be designed to individually select a real object or virtual object in the field of view of the end user 50 and/or globally select a subset or all real objects or virtual objects in the field of view of the end user 50. The object selection device 110 may also be configured for deselecting one or more previously selected real objects or virtual objects in response to additional input from the end user 50. In this case, the object selection device 110 may be designed to deselect real objects or virtual objects in the same manner that they were previously selected. In any event, the specific object is persistently selected, meaning that the specific object remains in a selected state until intentionally deselected.

In one embodiment, the display subsystem 102 may display a three-dimensional cursor in the field of view of the end user 50, which in response to input into the object selection device 110, may be displaced in the field of view of the end user 50 for the purpose of selecting a specific real object or virtual object in an augmented reality scene.

Figure 5:
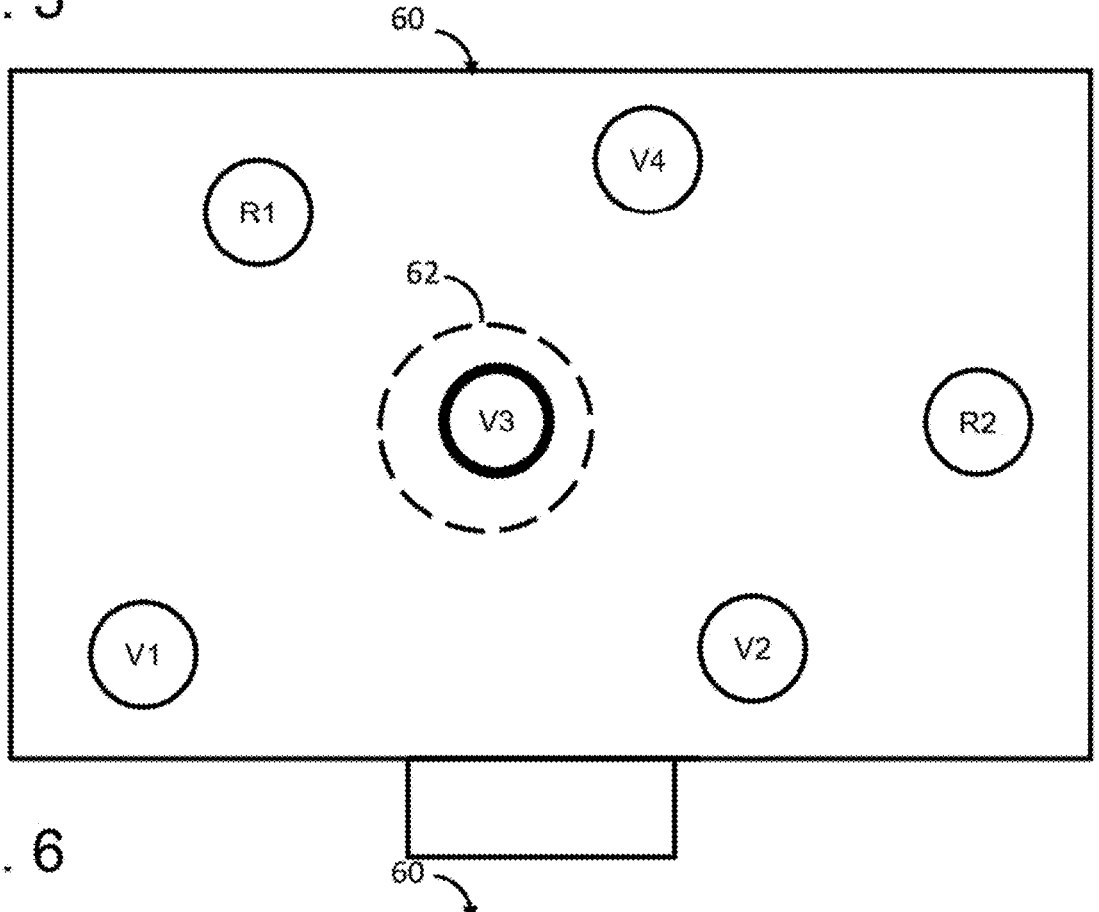
FIG. 5 is a plan view illustrating one technique used by the augmented reality system of FIG. 2 for allowing an end user to individually select an object.

For example, as shown in FIG. 5, four virtual objects (V1-V4) and two real objects (R1-R2) are located within a field of view 60 of the display screen 104. The display subsystem 102 may display a 3D cursor 62 in the field of view 60, which in the illustrated takes the form of a circle. The 3D cursor 62 may be moved over one of the objects, and in this case, over virtual object V3, in response to input by the end user 50 into the object selection device 110, thereby associating the 3D cursor 62 with that object. The associated object can then be selected, in response to additional input by the end user 50 into the object selection device 110. To provide visual feedback that a specific object (in this case, virtual object V3) is associated with the 3D cursor 62 and is ready for selection, the associated object, or even the 3D cursor 62, itself, may be highlighted (e.g., change in color or shade). Once selected, an object may remain highlighted until it is deselected. Of course, instead of virtual object V3 or in addition to the virtual object V3, other objects in the augmented reality scene 4, including real objects, can be selected by placing the 3D cursor 62 over any of these other objects and selecting the object within the 3D cursor 62. It should also be appreciated that although the 3D cursor 62 in FIG. 5 takes the form of a circle, the 3D cursor 62 can be any shape, including an arrow, that can be used by the end user 50 to point to a specific object. Any of the previously selected objects in the field of view 60 can be deselected by moving the 3D cursor 62 over that previously selected object and deselecting it.

The object selection device 110 can take the form of any device that allows the end user 50 to move the 3D cursor 62 over a specific object and subsequently select that specific object. In one embodiment, the object selection device 110 takes the form of a conventional physical controller, such as a mouse, touchpad, joystick, directional buttons, etc., that can be physically manipulated to move the 3D cursor 62 over a specific object and "clicked" to select the specific object.

In another embodiment, the object selection device 110 may comprise a microphone and corresponding voice interpretation module that, in response to voice commands, can move the 3D cursor 62 over a specific object, and then select the specific object. For example, the end user 50 may speak directional commands, e.g., move left or move right, to incrementally move the 3D cursor 62 over the specific object, and then speak a command, such as "select," to select the specific object.

In still another embodiment, the object selection device 110 may comprise one or more cameras (e.g., forward-facing camera(s) 112) mounted to the frame structure 106 and a corresponding processor (not shown) capable of tracking a physical gesture by the end user 50 (e.g., a finger movement) that correspondingly moves the 3D cursor 62 over a specific object for selection of the specific object. For example, the end user 50 may use a finger to "drag" the 3D cursor 62 within field of view 60 over a specific object, and then "tap" the 3D cursor 62 to select the specific object. Or, the forward-facing camera(s) 112 may, for example, be employed to detect or infer a center of attention of the end user 50, for example, based at least in part on an orientation of the head 54 of the end user 50 that correspondingly moves the 3D cursor 62 over a specific object for selection of the specific object. For example, the end user 50 may move his or her head 50 to "drag" the 3D cursor 62 within the field of view 60 over a specific object, and then quickly nod his or her head 50 to select the specific object.

In yet another embodiment, the object selection device 110 may comprises one or more cameras (e.g., rearward-facing camera(s) 114 (shown in FIG. 2)) and a corresponding processor that track the eyes 52 of the end user 50, and in particular the direction and/or distance at which the end user 50 is focused, which correspondingly moves the 3D cursor 62 over a specific object for selection of that specific object. The rearward-facing camera(s) 114 may track angular position (the direction in which the eye or eyes are pointing), blinking, and depth of focus (by detecting eye convergence) of the eyes 52 of the end user 50. For example, the end user 50 may move his or her eyes 54 within the field of view to "drag" the 3D cursor over a specific object, and then blink to select the specific object. Such eye tracking information may, for example, be discerned by projecting light at the end user's eyes, and detecting the return or reflection of at least some of that projected light. Further details discussing eye tracking devices are provided in U.S. Provisional patent application Ser. No. 14/212,961, entitled "Display Subsystem and Method," U.S. patent application Ser. No. 14/726,429, entitled "Methods and Subsystem for Creating Focal Planes in Virtual and Augmented Reality," and U.S. patent application Ser. No. 14/205,126, entitled "Subsystem and Method for Augmented and Virtual Reality," which are expressly incorporated herein by reference.

In alternative embodiments, the object selection device 110 may combine a conventional physical controller, microphone/voice interpretation module, and/or cameras to move and use the 3D cursor 62 to select an object. For example, a physical controller, finger gesture, or eye movement can be used to move the 3D cursor 62 over a specific object, and a voice command can be used to select that specific object.

Rather than use a 3D cursor 62 to select objects in the field of view of the end user 50, a specific object may be selected by semantically identifying that specific object or selecting the object via a menu displayed to the end user 50, in which case, the object need not be in the field of view of the end user 50. In this case, the object selection device 110 takes the form of a microphone and voice interpretation module if he specific object is semantically identified that translates verbal commands provided by the end user 50. For example, if virtual object V3 corresponds to drums, the end user 50 may speak "select drums," in response to which the drums V3 will be selected. To facilitate selection of the object corresponding to the verbal command, semantic information identifying all relevant objects in the field of view are preferably stored in a database, such that the description of the object verbally expressed by the end user 50 may be matched to the description of the object stored in the database. Meta data, including semantic information, can be previously associated with virtual objects in a database, whereas real objects in the field of view may be previously mapped and associated with semantic information in the manner described in U.S. patent application Ser. No. 14/704,800, entitled "Method and System for Inserting Recognized Object Data into a Virtual World," which is expressly incorporated by reference.

Figure 6:
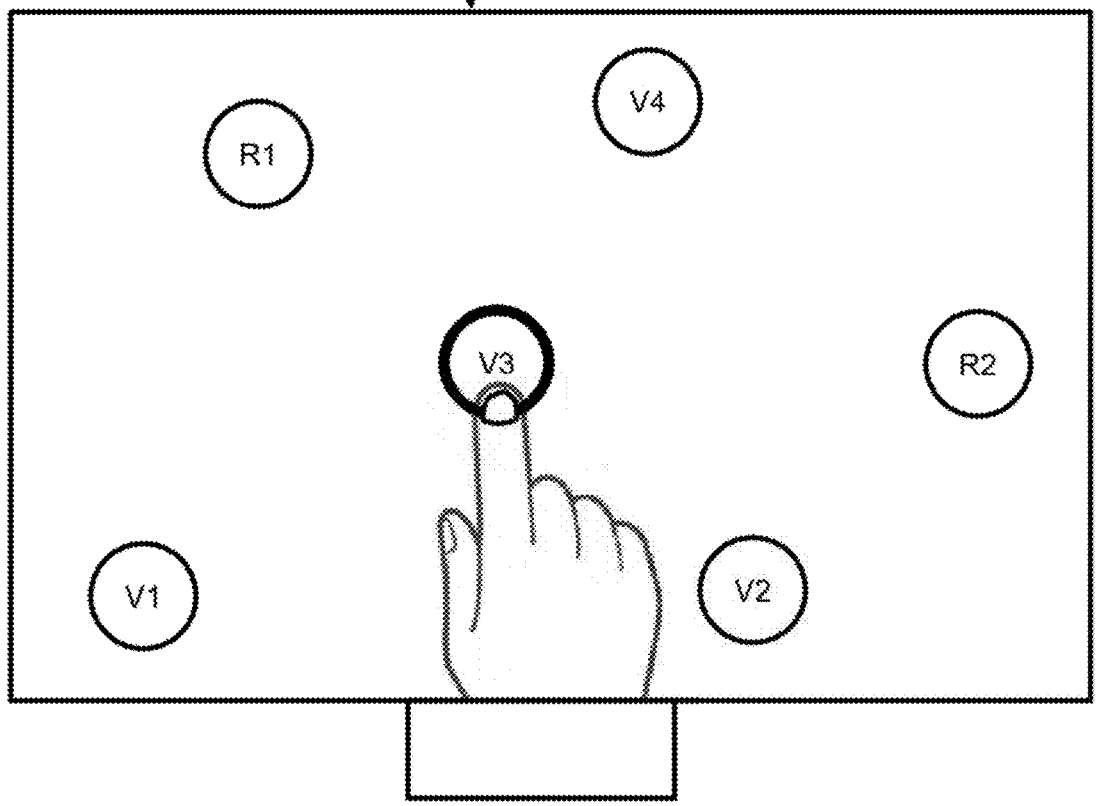
FIG. 6 is a plan view illustrating another technique used by the augmented reality system of FIG. 2 for allowing an end user to individually select an object.
Figure 7:
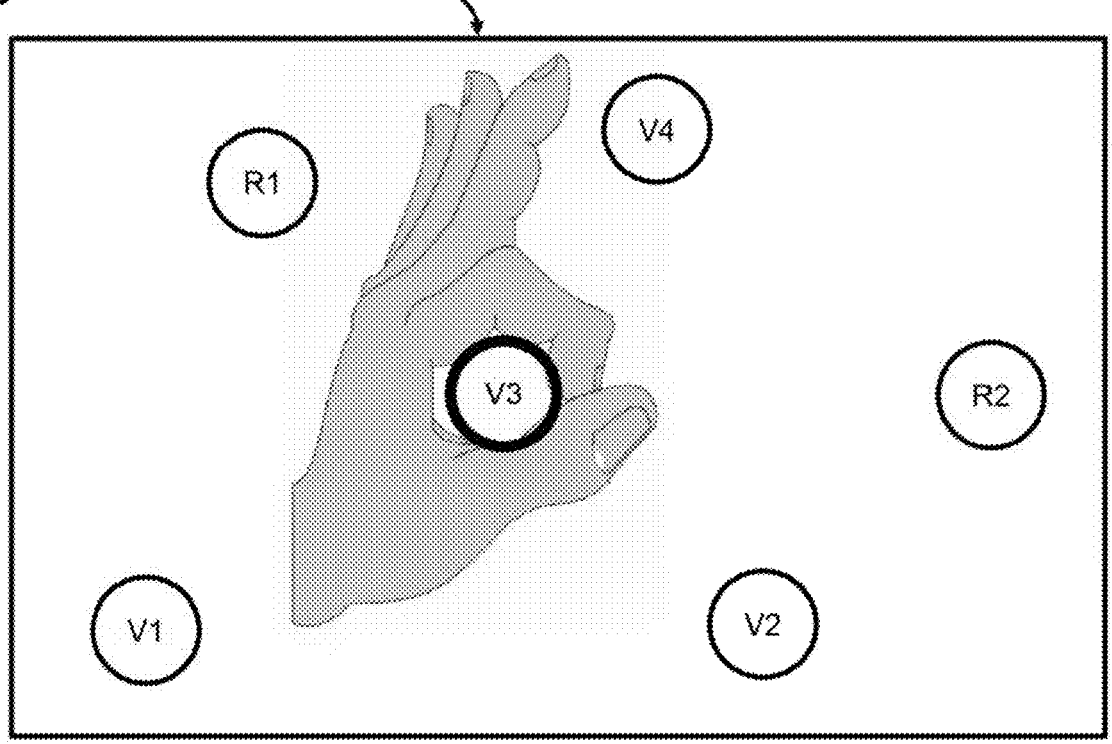
FIG. 7 is a plan view illustrating still another technique used by the augmented reality system of FIG. 2 for allowing an end user to individually select an object.

Alternatively, a specific object may be selected without using a 3D cursor 62 simply by pointing or "clicking" on it using a finger gesture. In this case, the object selection device 110 may comprise one or more cameras (e.g., the forward-facing cameras 114) and a corresponding processor that tracks a finger gesture for selection of the specific object. For example, the end user 50 may simply select a specific object (in this case, virtual object V3) by pointing at it, as shown in FIG. 6. In another embodiment, a specific object may be selected without using a 3D cursor 62 by forming a circle or partial circle using at least two fingers (e.g., the forefinger and thumb), as shown in FIG. 7.

Figure 8:
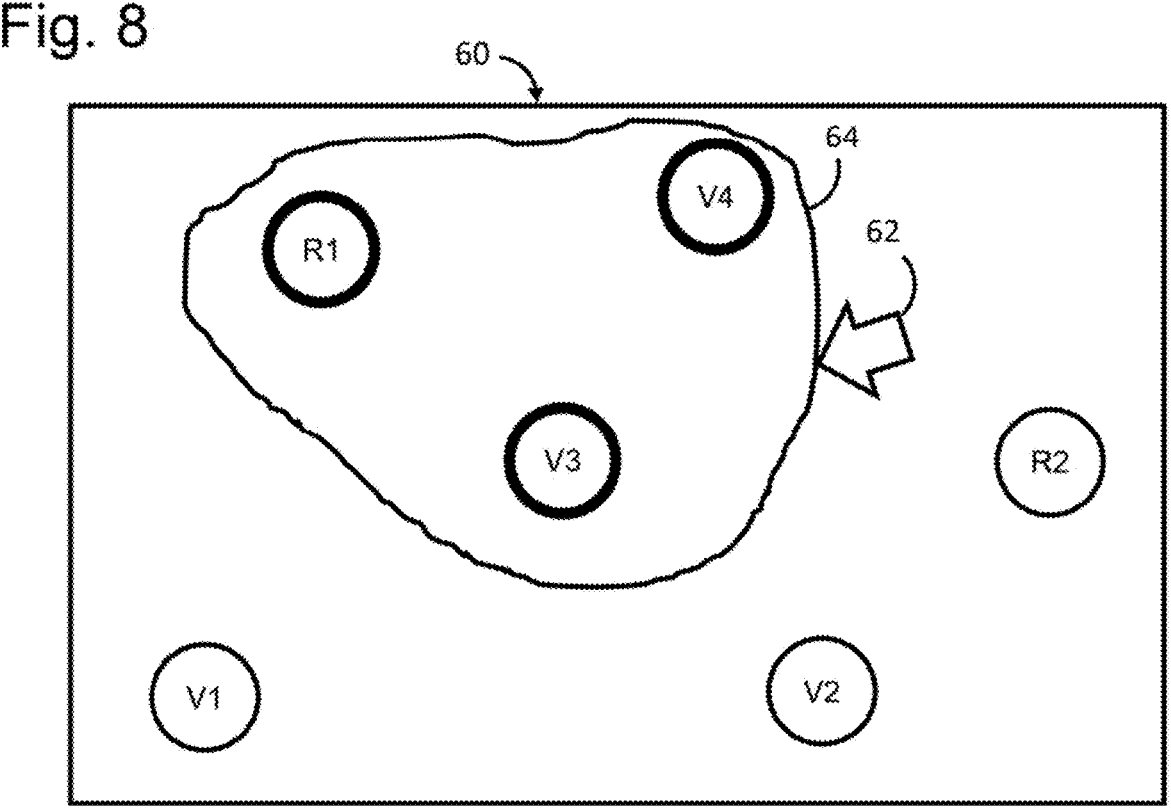
FIG. 8 is a plan view illustrating a technique used by the augmented reality system of FIG. 2 for allowing an end user to globally select multiple objects.

Although the 3D cursor 62 has been described as being used to select only one object at a time, in alternative or optional embodiments, the 3D cursor 62 may be used to select multiple objects at one time. For example, as illustrated in FIG. 8, a line 64 can be drawn around a group of objects using a 3D cursor 62, e.g., around real object R1 and virtual objects V3 and V4, thereby selecting these group of objects. The 3D cursor 62 can be controlled using, e.g., the same means described above for individually selecting objects. Alternatively, a line can be drawn around a group of objects without the use of a 3D cursor 62, e.g., by using a finger gesture.

Figure 9:
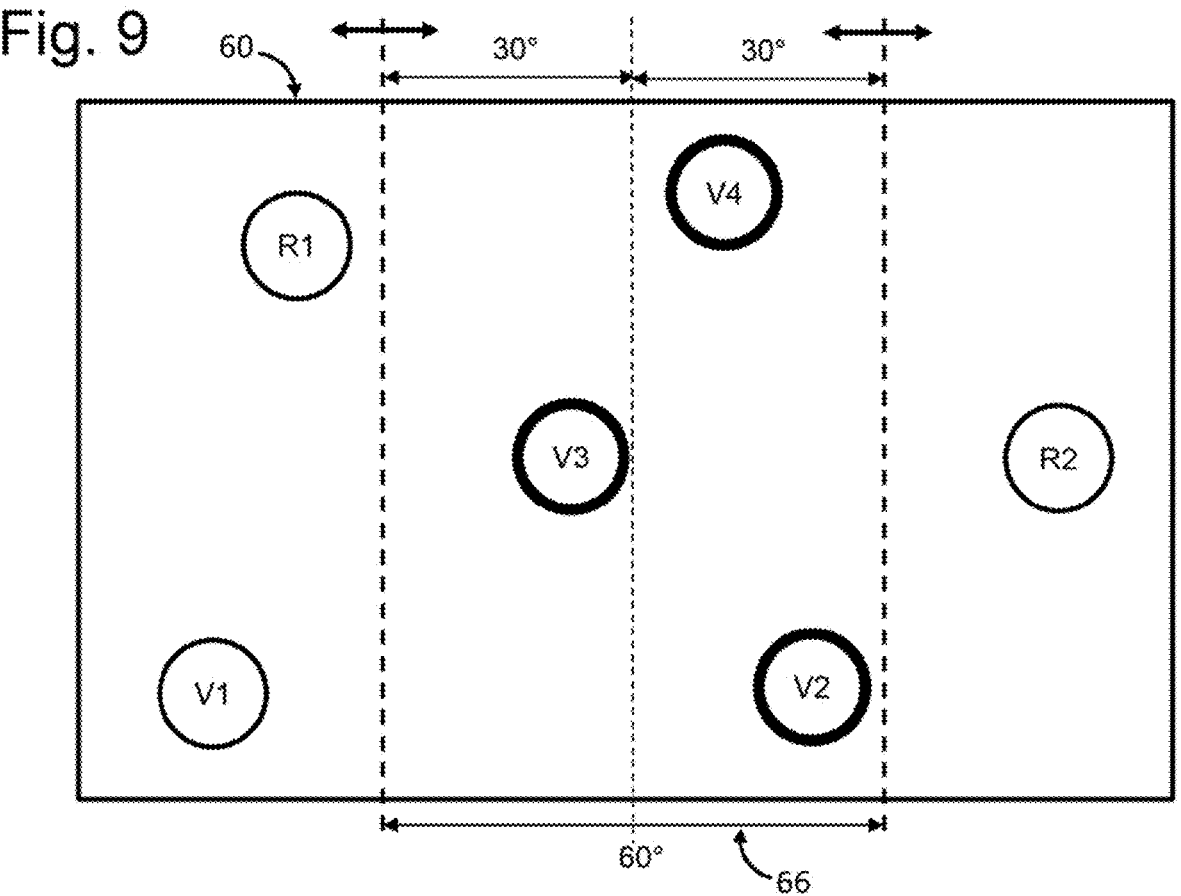
FIG. 9 is a plan view illustrating another technique used by the augmented reality system of FIG. 2 for allowing an end user to globally select multiple objects.

In an alternative embodiment, a group of objects in a pre-defined angular range of the field of view of the end user 50 may be selected, in which case, the object selection device 110 can take the form of, e.g., a single physical or virtual selection button that can be actuated by the end user 50 to select these objects. The angular range of the field of view may be previously defined by the end user 50 or may be preprogrammed into the augmented reality system 100. For example, as shown in FIG. 9, an angular range 66 of sixty degrees (±30 degrees from center of field of view) is shown in the context of a 120-degree field of view 60. All objects within the angular range 64 of the field of view 60 (in this case, virtual objects V1, V2, and V3) can be globally selected upon actuation of the selection button, while all objects outside of the angular range 64 of the field of view 60 (in this case, real objects R1 and R2, and virtual object V4) will not be selected upon actuation of the selection button. In one embodiment, the end user 50 may modify the angular range, e.g., by dragging one or both of the edges defining the angular range toward or away from the centerline of the field of view 60 (shown by the arrows). The end user 50 may, e.g., adjust the angular range from a minimum of 0 degrees to the entire field of view (e.g., 120 degrees). Alternatively, the angular range 64 of the field of view 60 may be pre-programmed without the ability for the end user 50 to adjust it. For example, all objects in the entirety of the field of view 60 may be selected in response to actuation of the selection button.

Figure 2:
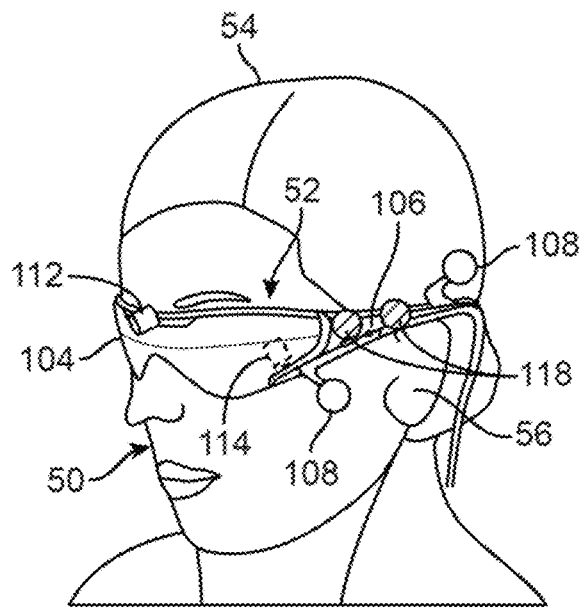
FIG. 2 is a perspective view of an augmented reality system constructed in accordance with one embodiment of the present inventions.

The augmented reality system 100 further comprises one or more microphones configured for converting sounds from real objects in the ambient environment to audio signals. In particular, the augmented reality system 100 comprises a microphone assembly 116 configured for preferentially receiving sound in a particular direction and/or at a particular distance that corresponds to the direction and distance of one or more real objects selected by the end user 50 via the object selection device 110. The microphone assembly 116 comprises an array of microphone elements 118 (e.g., four microphones) mounted to the frame structure 106, as illustrated in FIG. 2 (only two shown). Details on the microphone assembly 116 will be described in further detail below. The augmented reality system 100 further comprises a dedicated microphone 122 configured for converting speech of the end user 50 to audio signals, e.g., for receiving commands or narration from the end user 50.

The augmented reality system 100 tracks the position and orientation of the selected real object(s) within a known coordinate system, so that sounds originating from these real object(s) may be preferentially and continually sensed relative to non-selected real object(s) by the microphone assembly 116 even as the position or orientation of the selected real object(s) relative to the augmented reality system changes. The position and location of all virtual objects in the known coordinate system are typically "known" to (i.e., recorded in) the augmented reality system 100, and thus, do not generally need to be actively tracked.

In the illustrated embodiment, the augmented reality system 100 employs a spatialized audio system that renders and presents spatialized audio corresponding to virtual objects with the known virtual locations and orientations in real and physical three-dimensional (3D) space, making it appear to the end user 50 that the sounds are originating from the virtual locations of the real objects, so as to affect clarity or realism of the sound. The augmented reality system 100 tracks a position of the end user 50 to more accurately render spatialized audio, such that audio associated with various virtual objects appear to originate from their virtual positions. Further, the augmented reality system 100 tracks a head pose of the end user 50 to more accurately render spatialized audio, such that directional audio associated with various virtual objects appears to propagate in virtual directions appropriate for the respective virtual objects (e.g., out of the mouth of a virtual character, and not out of the back of the virtual characters' head). Moreover, the augmented reality system 100 takes into account other real physical and virtual objects in rendering the spatialized audio, such that audio associated with various virtual objects appear to appropriately reflect off of, or occluded or obstructed by, the real physical and virtual objects.

To this end, the augmented reality system 100 further comprises a head/object tracking subsystem 120 for tracking the position and orientation of the head 54 of the end user 50 relative to the virtual three-dimensional scene, as well as tracking the position and orientation of real objects relative to the head 54 of the end user 50. For example, the head/object tracking subsystem 120 may comprise one or more sensors configured for collecting head pose data (position and orientation) of the end user 50, and a processor (not shown) configured for determining the head pose of the end user 50 in the known coordinate system based on the head pose data collected by the sensor(s) 120. The sensor(s) may include one or more of image capture devices (such as visible and infrared light cameras), inertial measurement units (including accelerometers and gyroscopes), compasses, microphones, GPS units, or radio devices. In the illustrated embodiment, the sensor(s) comprises the forward-facing camera(s) 112 (shown in FIG. 2). When head worn in this manner, the forward-facing camera(s) 120 is particularly suited to capture information indicative of distance and angular position (i.e., the direction in which the head is pointed) of the head 54 of the end user 50 with respect to the environment in which the end user 50 is located. Head orientation may be detected in any direction (e.g., up/down, left, right with respect to the reference frame of the end user 50). As will be described in further detail below, the forward-facing camera(s) 114 are also configured for acquiring video data of real objects in the ambient environment to facilitate the video recording function of the augmented reality system 100. Cameras may also be provided for tracking real objects in the ambient environment. The frame structure 106 may be designed, such that the cameras may be mounted on the front and back of the frame structure 106. In this manner, the array of cameras may encircle the head 54 of the end user 50 to cover all directions of relevant objects.

The augmented reality system 100 further comprises a three-dimensional database 124 configured for storing a virtual three-dimensional scene, which comprises virtual objects (both content data of the virtual objects, as well as absolute meta data associated with these virtual objects, e.g., the absolute position and orientation of these virtual objects in the 3D scene) and virtual objects (both content data of the virtual objects, as well as absolute meta data associated with these virtual objects, e.g., the volume and absolute position and orientation of these virtual objects in the 3D scene, as well as space acoustics surrounding each virtual object, including any virtual or real objects in the vicinity of the virtual source, room dimensions, wall/floor materials, etc.).

The augmented reality system 100 further comprises a control subsystem that, in addition to recording video data originating from virtual objects and real objects that appear in the field of view, records audio data originating from only those virtual objects and real objects that the end user 50 has selected via the object selection device 110. The augmented reality system 100 may also record meta data associated with the video data and audio data, so that synchronized video and audio may be accurately re-rendered during playback.

To this end, the control subsystem comprises a video processor 126 configured for acquiring the video content and absolute meta data associated with the virtual objects from the three-dimensional database 124 and acquiring head pose data of the end user 50 (which will be used to localize the absolute meta data for the video to the head 54 of the end user 50, as described in further detail below) from the head/object tracking subsystem 120, and rendering video therefrom, which is then conveyed to the display subsystem 102 for transformation into images that are intermixed with images originating from real objects in the ambient environment in the field of view of the end user 50. The video processor 126 is also configured for acquiring video data originating from real objects of the ambient environment from the forward-facing camera(s) 112, which along with video data originating from the virtual objects, will be subsequently recorded, as will be further described below.

Similarly, the audio processor 128 is configured for acquiring audio content and meta data associated with the virtual objects from the three-dimensional database 124 and acquiring head pose data of the end user 50 (which will be used to localize the absolute meta data for the audio to the head 54 of the end user 50, as described in further detail below) from the head/object tracking subsystem 120, and rendering spatialized audio therefrom, which is then conveyed to the speaker(s) 108 for transformation into spatialized sound that is intermixed with the sounds originating from the real objects in the ambient environment.

The audio processor 128 is also configured for acquiring audio data originating from only the selected real object(s) in the ambient environment from the microphone assembly 116, which along with the spatialized audio data from the selected virtual objects, along with any resulting meta data localized to the head 54 of the end user 50 (e.g., position, orientation, and volume data) for each virtual object, as well as global meta data (e.g., volume data globally set by the augmented reality system 100 or end user 50), will be subsequently recorded, as will be further described below.

The augmented reality system 100 further comprises memory 130, a recorder 132 configured for storing video and audio in the memory 130, and a player 134 configured for retrieving the video and audio from the memory 130 for subsequent playback to the end user 50 or other end users. The recorder 132 acquires the spatialized audio data (both audio content audio data and meta data) corresponding to the selected virtual and real objects from the audio processor 128, and stores this audio data in the memory 130, and further acquires video data (both video content data and meta data) corresponding to the virtual and real objects that coincide with the selected virtual and real objects. Although the player 134 is illustrated as being located in the same AR system 100 in which the recorder 132 and memory 130 are located, it should be appreciated that a player may be located in a third-party AR system or even on smart phone or computer that plays back the video and audio previously recorded by the AR system 100.

The control subsystem that performs the functions of the video processor 126, audio processor 128, recorder 132, and player 134 may take any of a large variety of forms, and may include a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance, field PGAs (FPGAs), and/or programmable logic controllers (PLUs).

The functions of the video processor 126, audio processor 128, recorder 132, and player 134 may be respectively performed by single integrated devices, at least some of the functions of the video processor 126, audio processor 128, recorder 132, and/or player 134 may be combined into a single integrated device, or the functions of each of the video processor 126, audio processor 128, recorder 132, or player 134 may be distributed amongst several devices. For example, the video processor 126 may comprise a graphics processing unit (GPU) that acquires the video data of virtual objects from the three-dimensional database 124 and renders the synthetic video frames therefrom, and a central processing unit (CPU) that acquires the video frames of real objects from the forward-facing camera(s) 112. Similarly, the audio processor 128 may comprise a digital signal processor (DSP) that processes the audio data acquired from the microphone assembly 116 and user microphone 122, and the CPU that processes the audio data acquired from the three-dimensional database 124. The recording functions of the recorder 132 and playback functions of the player 134 may be performed by the CPU.

Figure 10A:
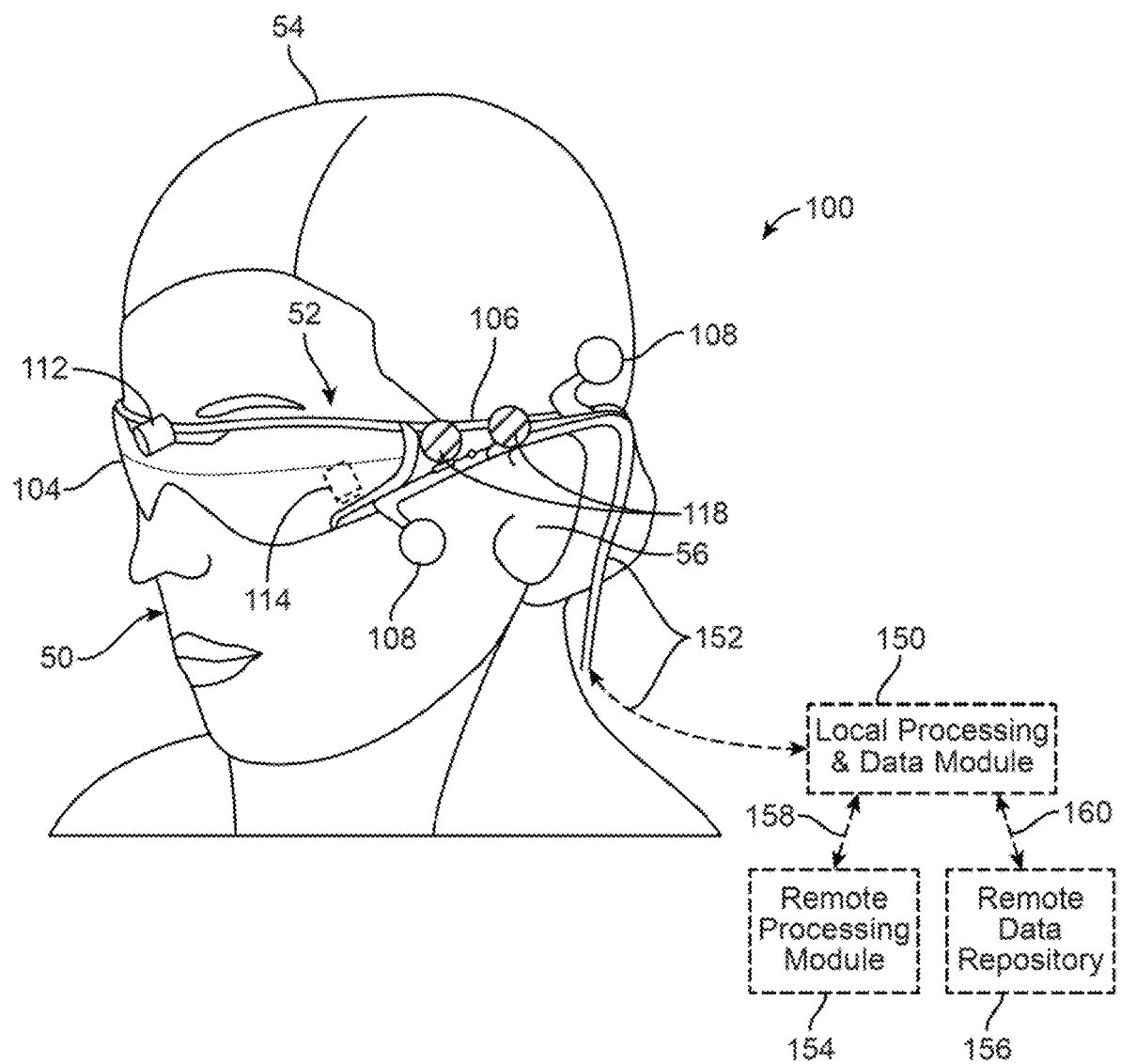
FIG. 10a is a plan view of one technique that can be used to wear the augmented reality system of FIG. 2.
Figure 10B:
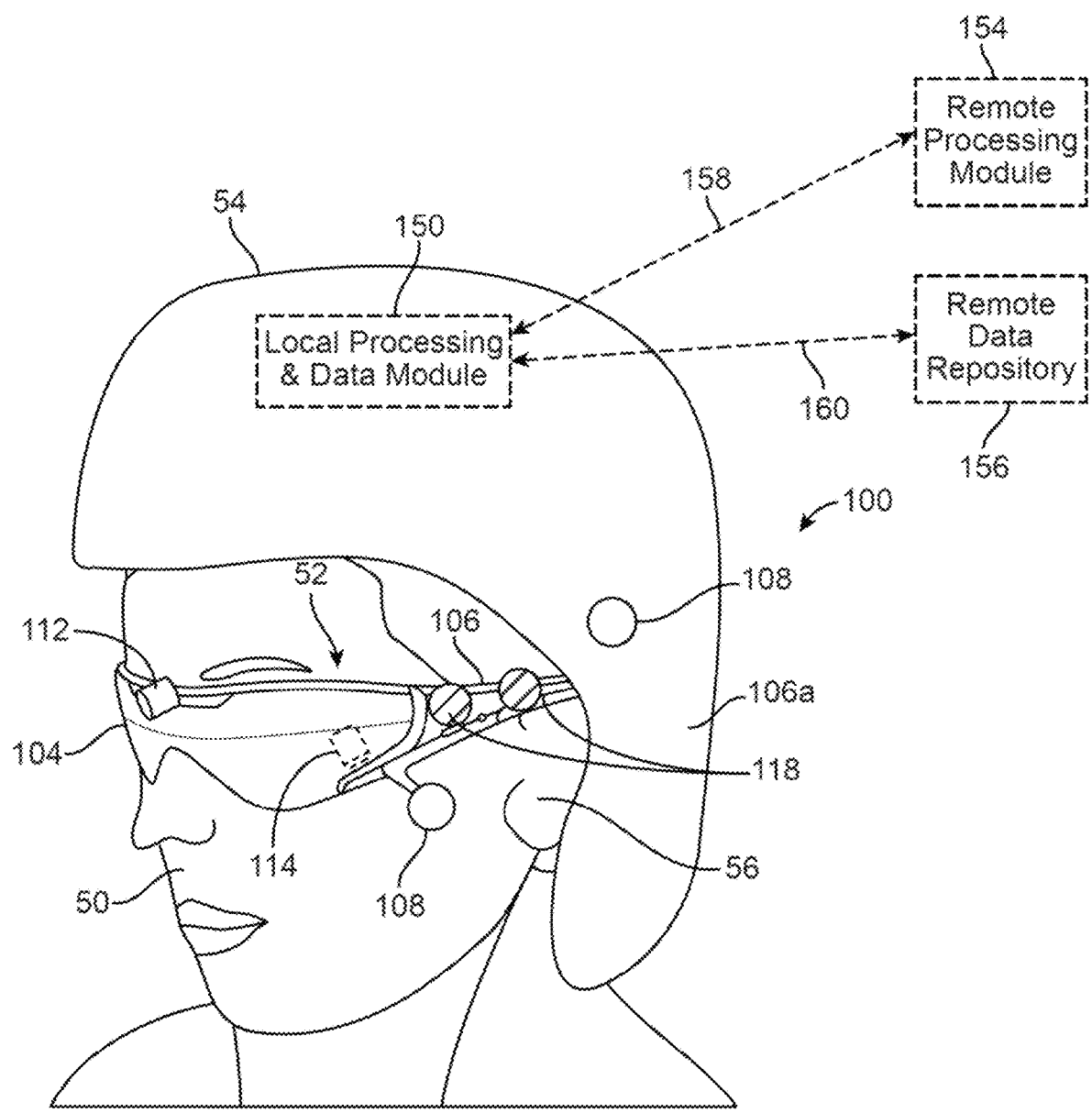
FIG. 10b is a plan view of another technique that can be used to wear the augmented reality system of FIG. 2.
Figure 10C:
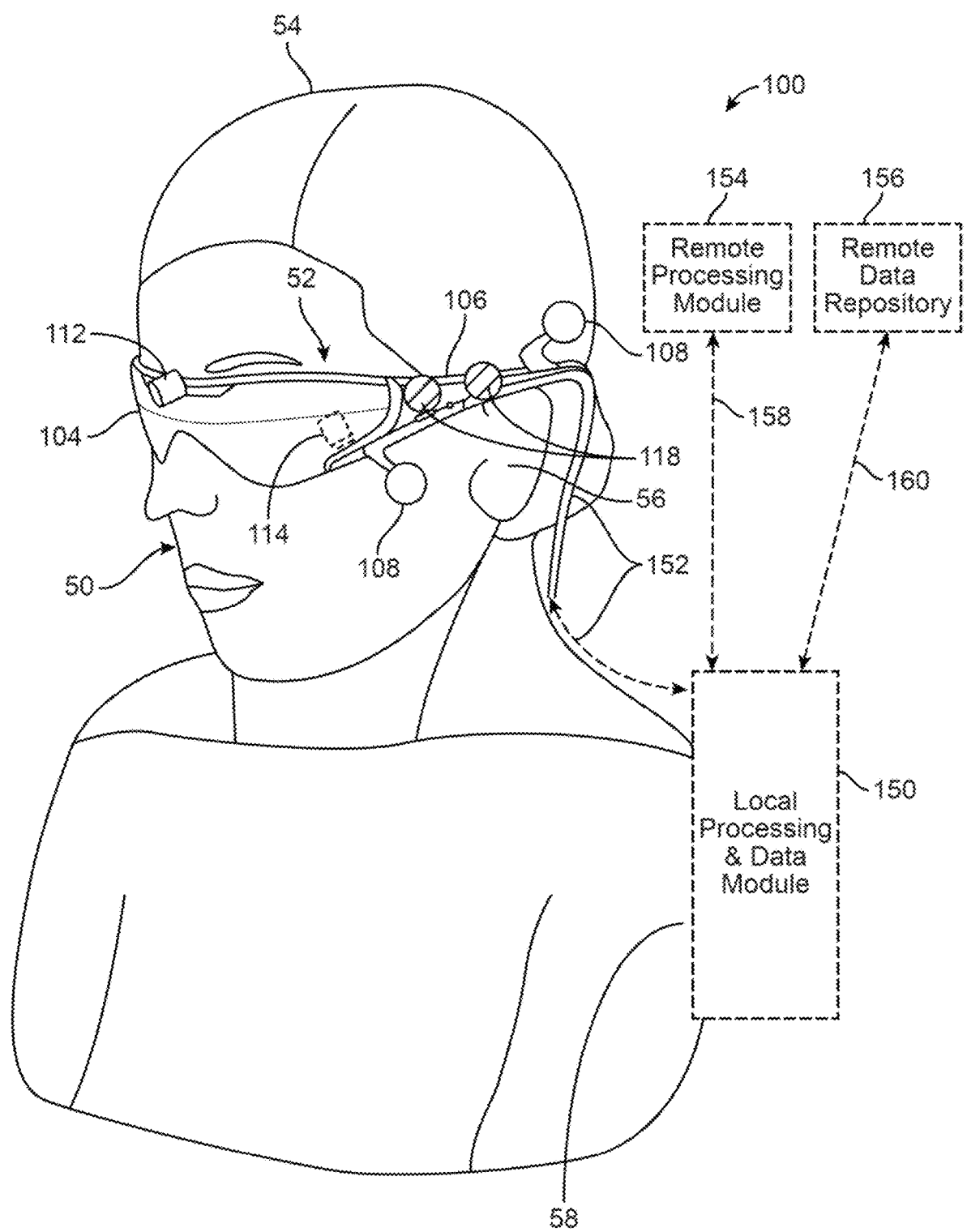
FIG. 10c is a plan view of still another technique that can be used to wear the augmented reality system of FIG. 2.
Figure 10D:
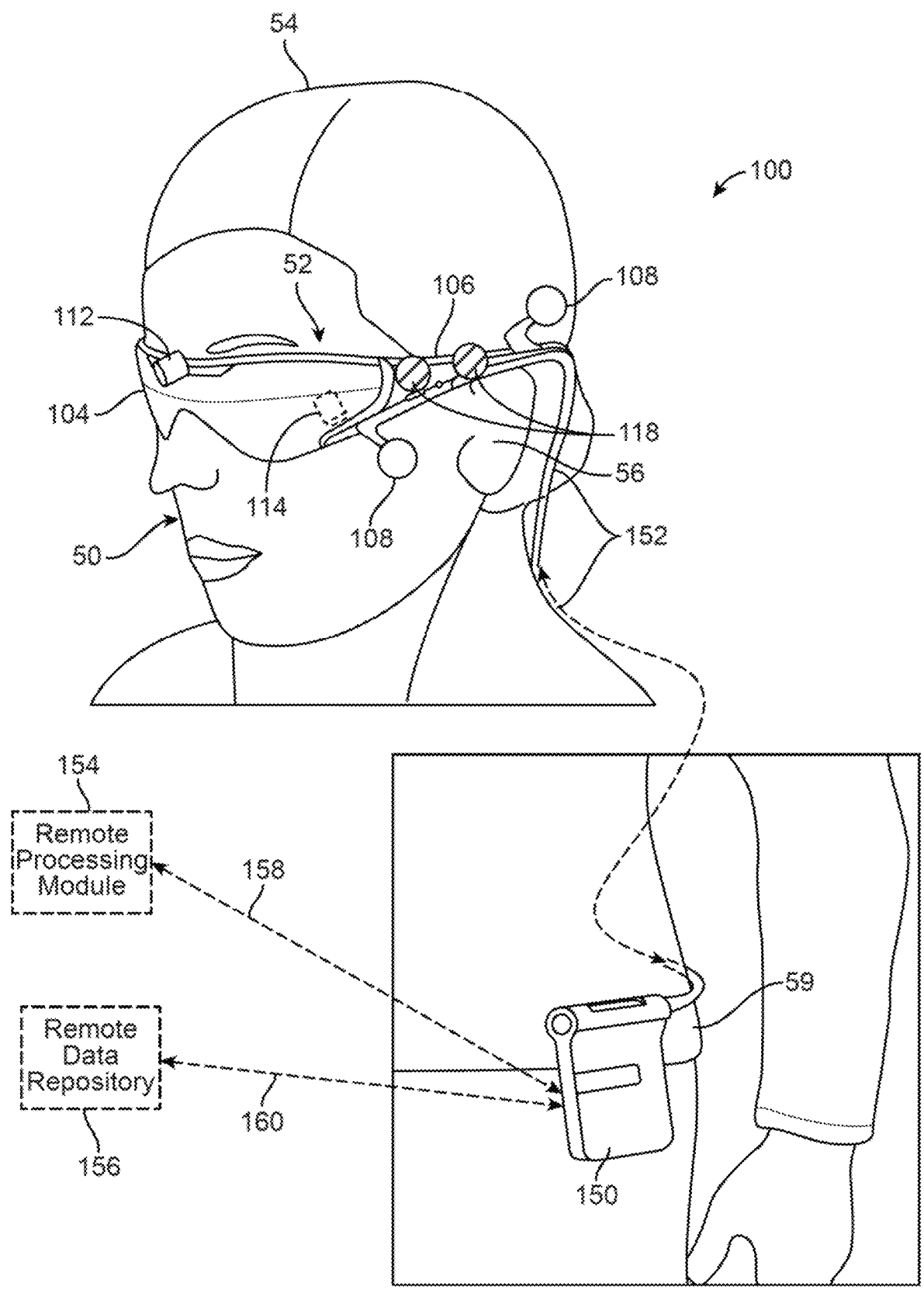
FIG. 10d is a plan view of yet another technique that can be used to wear the augmented reality system of FIG. 2.

Furthermore, the various processing components of the augmented reality system 100 may be physically contained in a distributed subsystem. For example, as illustrated in FIG. 10a-10d, the augmented reality system 100 comprises a local processing and data module 150 operatively coupled, such as by a wired lead or wireless connectivity 152, to components mounted to the head 54 of the end user 50 (e.g., the projection subsystem of the display subsystem 102, microphone assembly 116, speakers 104, and cameras 114, 118). The local processing and data module 150 may be mounted in a variety of configurations, such as fixedly attached to the frame structure 106 (FIG. 10a), fixedly attached to a helmet or hat 106a (FIG. 10b), embedded in headphones, removably attached to the torso 58 of the end user 50 (FIG. 10c), or removably attached to the hip 59 of the end user 50 in a belt-coupling style configuration (FIG. 10d). The augmented reality system 100 further comprises a remote processing module 154 and remote data repository 156 operatively coupled, such as by a wired lead or wireless connectivity 158, 160, to the local processing and data module 150, such that these remote modules 154, 156 are operatively coupled to each other and available as resources to the local processing and data module 150.

The local processing and data module 150 may comprise a power-efficient processor or controller, as well as digital memory, such as flash memory, both of which may be utilized to assist in the processing, caching, and storage of data captured from the sensors and/or acquired and/or processed using the remote processing module 1544 and/or remote data repository 156, possibly for passage to the display subsystem 102 after such processing or retrieval. The remote processing module 154 may comprise one or more relatively powerful processors or controllers configured to analyze and process data and/or image information.

The remote data repository 156 may comprise a relatively large-scale digital data storage facility, which may be available through the internet or other networking configuration in a "cloud" resource configuration. In one embodiment, all data is stored and all computation is performed in the local processing and data module 150, allowing fully autonomous use from any remote modules.

The couplings 152, 158, 160 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of optical fiber(s) used in the display subsystem 102. In still further implementations, the choice of wired and wireless communications may be different from that illustrated in FIGS. 10a-10d. Thus, the particular choice of wired or wireless communications should not be considered limiting.

In the illustrated embodiment, light source(s) and drive electronics (not shown) of the display subsystem 102, and the processing components of the had/object tracking subsystem 120 and object selection device 110, and the DSP of the audio processor 128 may be contained in the local processing and data module 150. The GPU of the video processor 126 and CPU of the video processor 126 and audio processor 128 may be contained in the remote processing module 154, although in alternative embodiments, these components, or portions thereof may be contained in the local processing and data module 150. The three-dimensional database 124 and memory 130 can be associated with the remote data repository 156.

Figure 3:
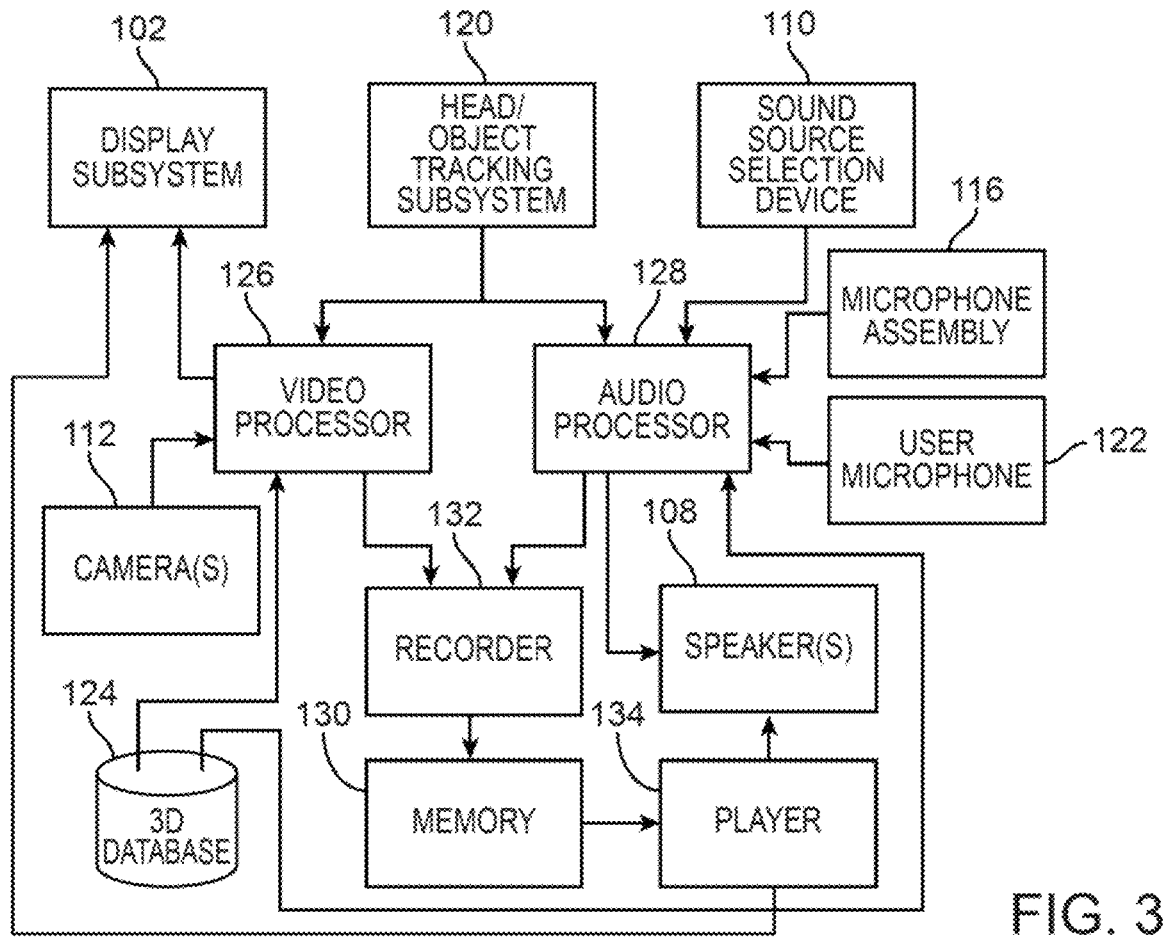
FIG. 3 is a block diagram of the augmented reality system of FIG. 2.
Figure 11:
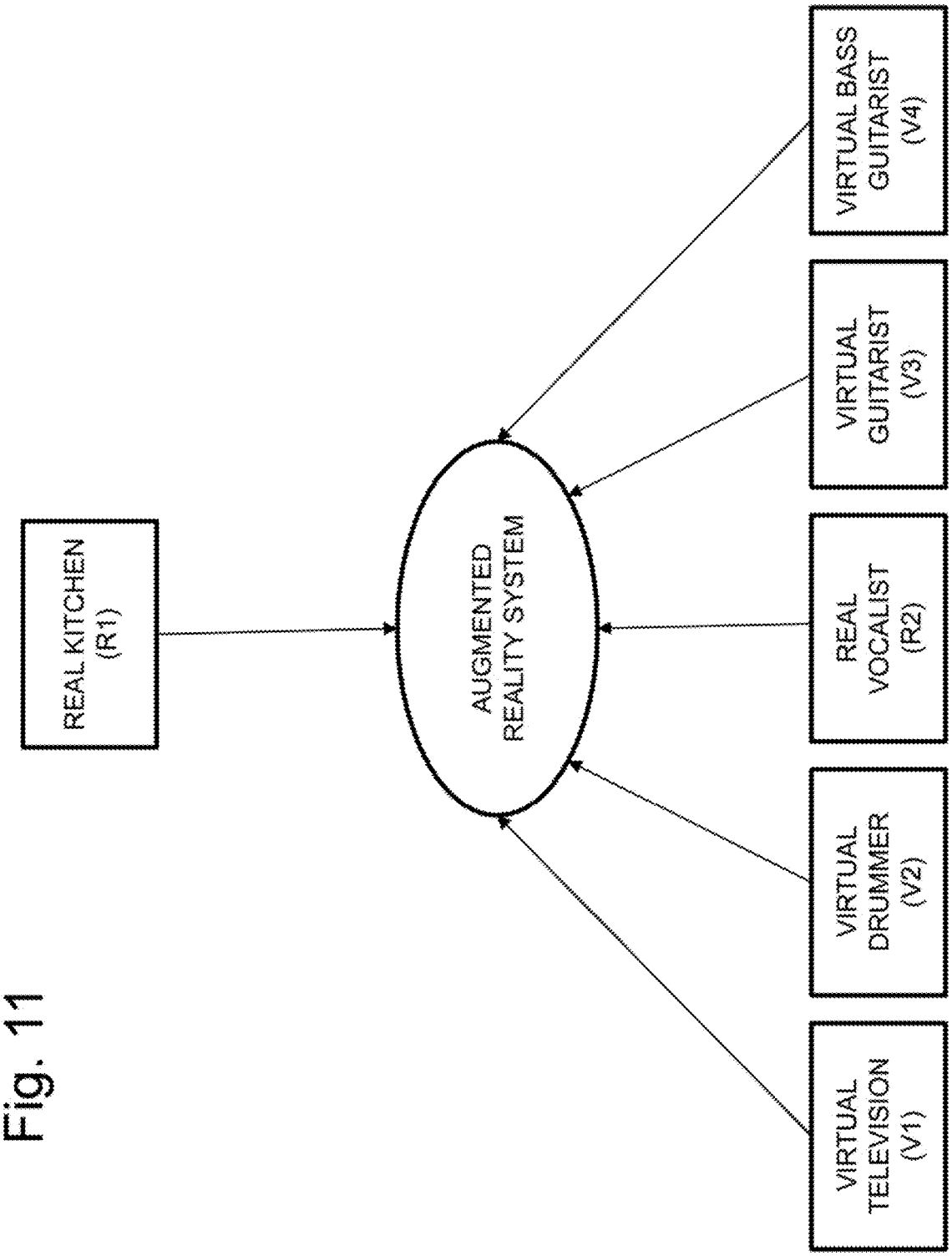
FIG. 11 is a block diagram illustrating the augmented reality system of FIG. 2 interacting with various exemplary various virtual and real sound.

The audio processor 128 illustrated in FIG. 3 will be described in further detail in processing and recording audio data from virtual and real objects selected by the end user 50. In the exemplary scenario shown in FIG. 11, the end user 50 (e.g., a parent) desires to record the sounds from a four-piece band, including a virtual drummer V2 object, a real vocalist R2, e.g., a child, a virtual guitarist V3, and a virtual bass guitarist V4, desires to monitor news or sports on a virtual television V1 without recording the sounds from the virtual television, and further does not desire to record sounds from a real kitchen R1, e.g., someone cooking.

Figure 12:
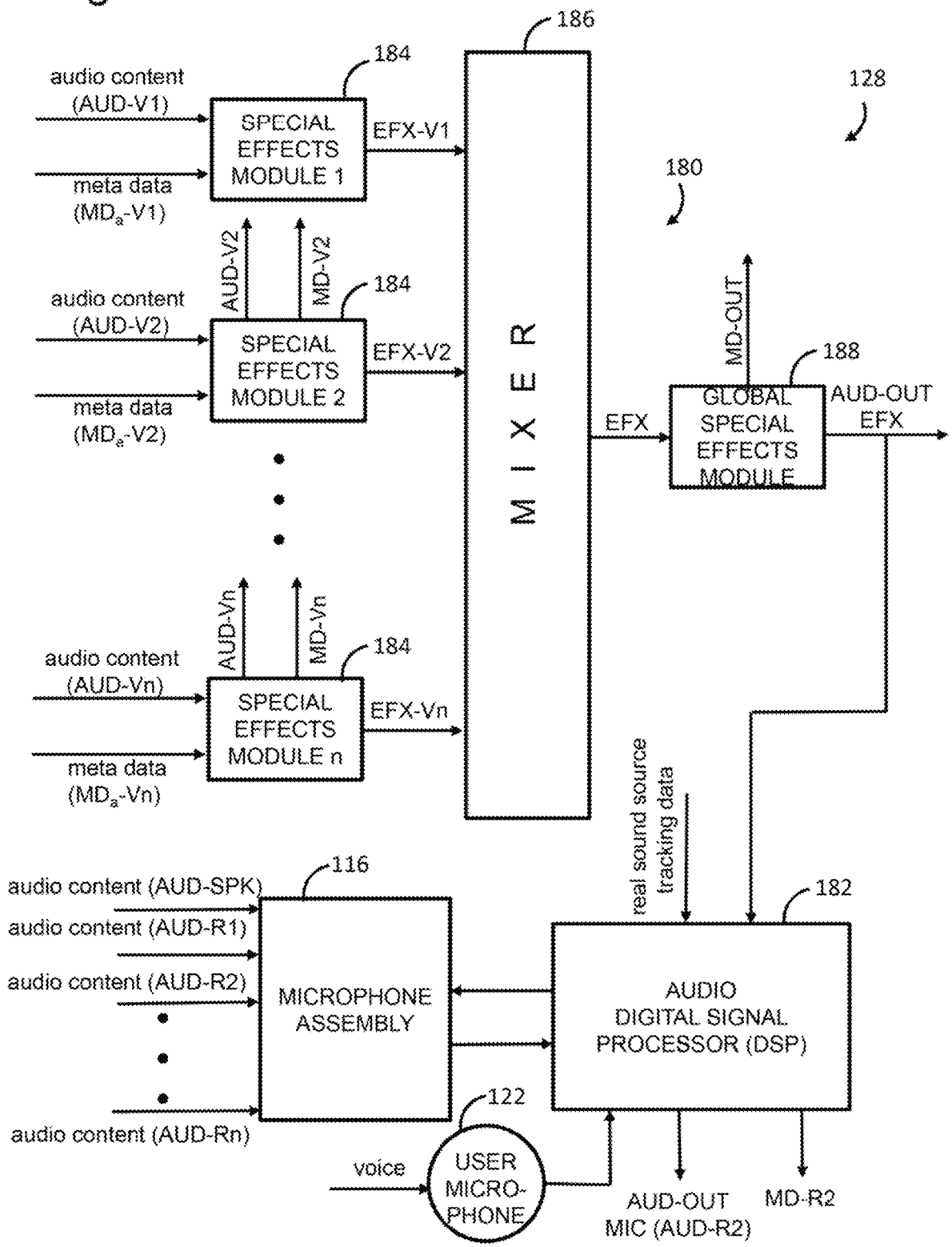
FIG. 12 is a block diagram illustrating one embodiment of an audio processor used in the augmented reality system of FIG. 2.

In the embodiment illustrated in FIG. 12, the functions of the audio processor 128 are distributed between a CPU 180, which processes the audio originating from virtual objects, and a DSP 182, which processes the audio originating from real objects. The CPU 180 comprises one or more special effects modules 184 (in this case, special effects modules 1-n) configured for generating spatialized audio data EFX-V1-EFX-Vn corresponding to the individual virtual objects V1-Vn. To this end, the special effects modules 184 acquire audio content data AUD-V1 to AUD-Vn and absolute meta data $MD_a$-V1 to $MD_a$-Vn corresponding to the virtual objects V1-Vn from the 3D database 124, as well as head pose data from the head/object tracking subsystem 120, localizes the absolute meta data $MD_a$-V1 to $MD_a$-Vn to the head 54 of the end user 50 based on the head pose data, and applies the localized meta data (e.g., position, orientation, and volume data) to the audio content data to generate the spatialized audio data for the virtual objects V1-Vn.

The CPU 180 further comprises a mixer 186 configured for mixing the spatialized audio data EFX-V1-EFX-Vn received from the respective special effects module(s) 184 to obtain the mixed audio data EFX, and a global special effects module 188 configured for applying global meta data MD-OUT (e.g., global volume) to the mixed spatialized audio data to obtain final spatialized audio AUD-OUT EFX that is output through multiple sound channels to the speakers 108.

Figure 13:
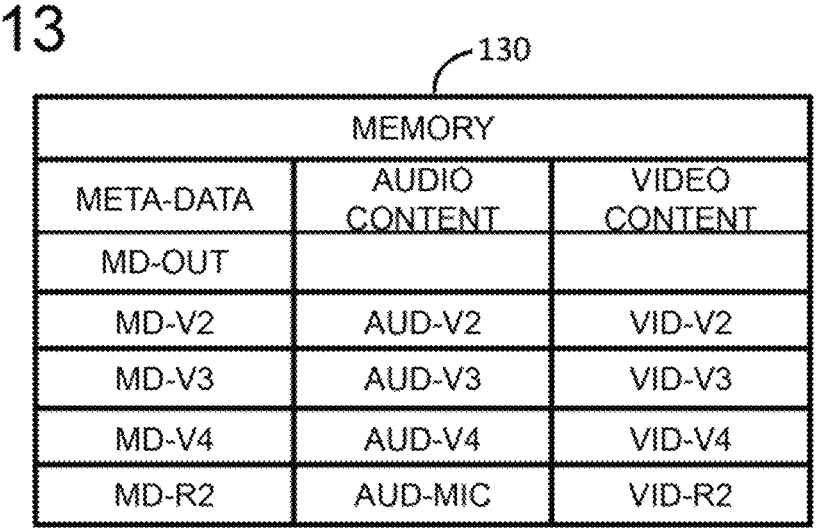
FIG. 13 is a diagram of memory recording the content data and meta data corresponding to virtual and real objects selected by the augmented reality system of FIG. 2.

Significantly, the special effects module(s) 184 is configured for sending the audio content data originating from the virtual objects that have been selected by the end user 50 via the object selection device 110 and the meta data (localized and/or absolute) corresponding to these selected virtual objects to the recorder 132 for storage in the memory 130 (shown in FIG. 2), and the global special effects module 188 is configured for sending the global meta data MD-OUT to the recorder 132 for storage in the memory 130. In the exemplary embodiment, the virtual audio content data AUD-V2 (i.e., virtual drummer), AUD-V3 (i.e., the virtual guitarist), AUD-V4 (i.e., virtual bass guitarist) are selected for recording, while the audio content data AUD-V1 (i.e., the virtual television) is not selected for recording. Thus, the audio content data AUD-V2, AUD-V3, and AUD-V4 and the corresponding localized meta data MD-V2, MD-V3, and MD-V4 is stored in the memory 130, as shown in FIG. 13.

In an alternative embodiment, instead of, or in addition to, individually storing the audio content data from the selected virtual objects and the corresponding localized/absolute meta data and global meta data within the memory 130, the CPU 180 outputs spatialized audio generated by additionally mixing the spatialized audio data EFX-V2, EFX-V3, EFX-V4 corresponding to only the selected virtual objects AUD-V2, AUD-V3, and AUD-V4 and applying global meta data MD-OUT to this mixed spatialized audio data to obtain spatialized audio that includes only the audio from the selected virtual objects AUD-V2, AUD-V3, and AUD-V4. However, in this case, an additional audio mixing function will need to be incorporated into the CPU 180.

The DSP 182 is configured for processing audio signals acquired from the microphone assembly 116 and outputting audio signals preferentially representing sounds received by the microphone assembly 116 from a particular direction, and in this case, from the direction of each real object selected by the end user 50 via the object selection device 110. Because the position and/or orientation of the real object may move relative to the head 54 of the end user 50, real object tracking data may be received from the head/object tracking subsystem 120, such that any change in the position and/or orientation of the real object relative to the head 54 of the end user 50 may be taken into account, so that the DSP 182 may dynamically modify the audio output to preferentially represent sounds received by the microphone assembly 116 from the direction of the relatively moving real object. For example, if the end user 50 moves his or her head 54 counter-clockwise ninety degrees relative to the orientation of the head 54 when the real object was selected, the preferential direction of the audio output from the DSP 182 can be dynamically shifted clock-wise ninety degrees.

Figure 14:
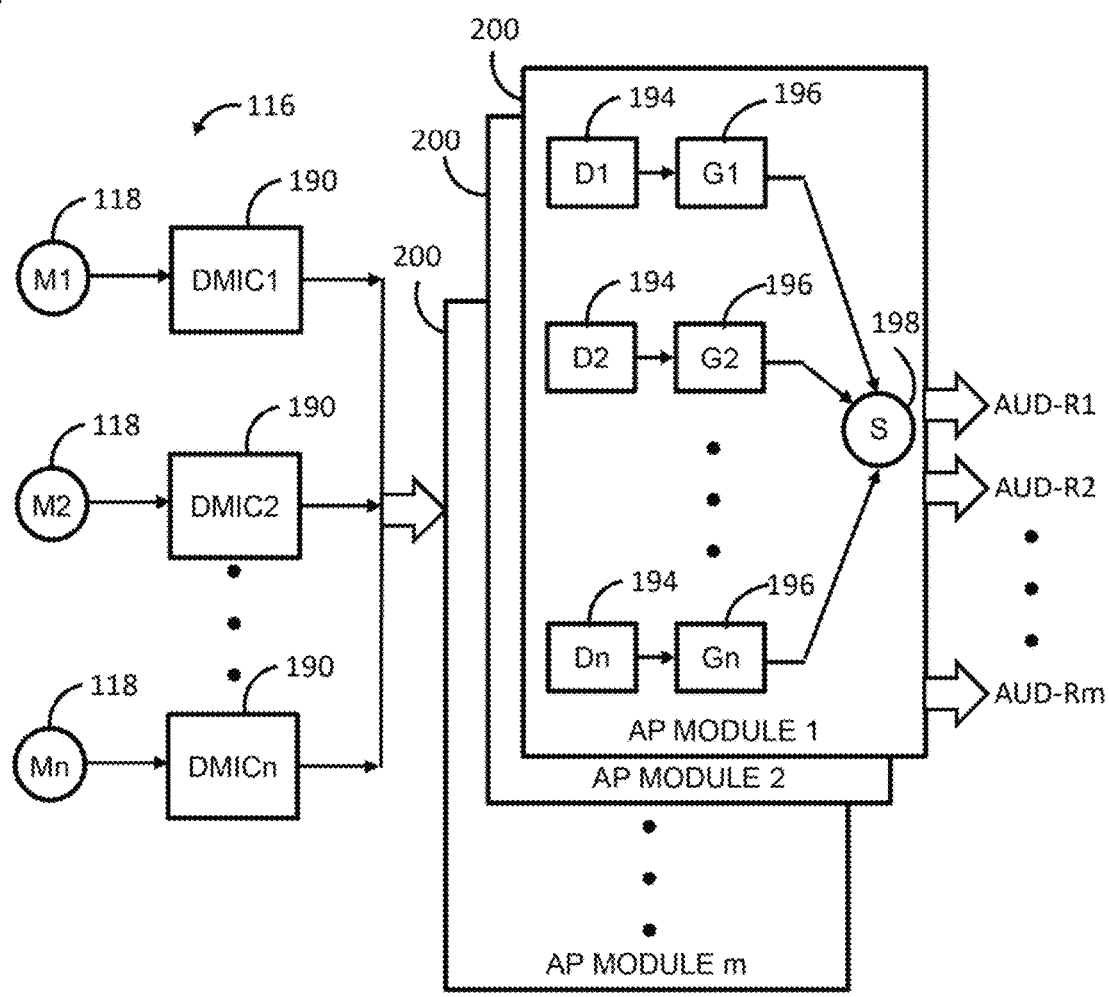
FIG. 14 is a schematic of a microphone assembly and corresponding audio processing modules used in the augmented reality system of FIG. 2 for preferentially receiving sound from real objects.

With reference to FIG. 14, the microphone elements 118 of the microphone assembly 116 take the form of a phased array of microphone elements (in this case, microphone elements M1-Mn), each of which is configured for detecting and converting ambient sound signals into an audio signal. In the illustrated embodiment, the microphone elements 118 are digital in nature, and thus, convert the ambient sound signal into digital audio signals, and in this case pulse density modulation (PDM) signals. Preferably, the microphone elements 118 are spaced from each other to maximize directionality of the audio output. For example, as shown in FIG. 2, two of the microphone elements 118 may be mounted to each arm of the frame structure 106, although more than two, such as four microphone elements 118 may be mounted to each arm of the frame structure 106. Alternatively, the frame structure 106 may be designed, such that the microphone elements 118 may be mounted on the front and back of the frame structure 106. In this manner, the array of microphone elements 118 may encircle the head 54 of the end user 50 to cover all directions of potential sources of sound.

The microphone assembly 116 further comprises a plurality of digital microphone interfaces (DMICs) 190 (in this case, DMIC1-DMICn, one for each microphone element M) that are configured for respectively receiving the respective digital audio signals from the corresponding microphone elements 118 and performing a digital filter operation referred to as "decimation" to convert the digital audio signals from the PDM format to a more easily manipulatable pulse code modulation (PCM). Each of the DMICs 190 also performs fixed gain control on the digital audio signals.

The DSP 182 comprises a plurality of audio processing modules 200, each of which is configured for processing the digital audio signal output by the microphone assembly 116, and outputting a directional audio signal AUD-R (one of directional audio signals AUD-R1 to AUD-Rm) that preferentially represents sound received by the microphone assembly 116 in the direction of a selected real object (one of R1 to Rm). The directional audio signals AUD-R1 to AUD-Rm output by the respective audio processing modules 200 are combined into a directional audio output AUD-OUT MIC, which preferentially represents sound originating from all selected real objects. In the illustrated embodiment, the DSP 182 creates one instance of an audio processing module 200 for each real object selected by the end user 50 via the object selection device 110.

To this end, each of the audio processing modules 200 comprises processing parameters in the form of a plurality of delay elements 194 (in this case, delay elements D1-Dn, one for each microphone element M), a plurality of gain elements 196 (in this case, gain elements G1-Gn, one for each microphone element M), and a summer 198. The delay elements 194 respectively apply delay factors to the amplified digital signals received from the corresponding gain amplifiers 192 of the microphone assembly 116, and the gain elements 196 respectively apply gain factors to the delayed digital signals. The summer 198 (S) adds the gain adjusted and delayed signals to respectively generate the respective directional audio signal AUD-R.

The microphone elements 118 are spatially arranged and the delay elements 194 and gain elements 196 of each audio processing module 200 are applied to the digital audio signals received from the microphone assembly 116 in a manner that results in the receipt of ambient sound in accordance with a directional polar pattern (i.e., sounds arriving from a particular angular direction or directions will be emphasized more than sounds arriving from other angular directions). The DSP 182 is configured for modifying the directionality of the directional audio signals AUD-R1 to AUD-Rm, and thus the combined directional audio output AUD-OUT MIC by changing the delay factors of the delay elements 194 and the gain factors of the gain elements 196.

Thus, it can be appreciated that the directionality of the audio output AUD-OUT MIC is modified based on the selected real object, e.g., the direction or directions from which sound is preferentially received may be set along the direction of the selected real object or sources.

Figure 15A:
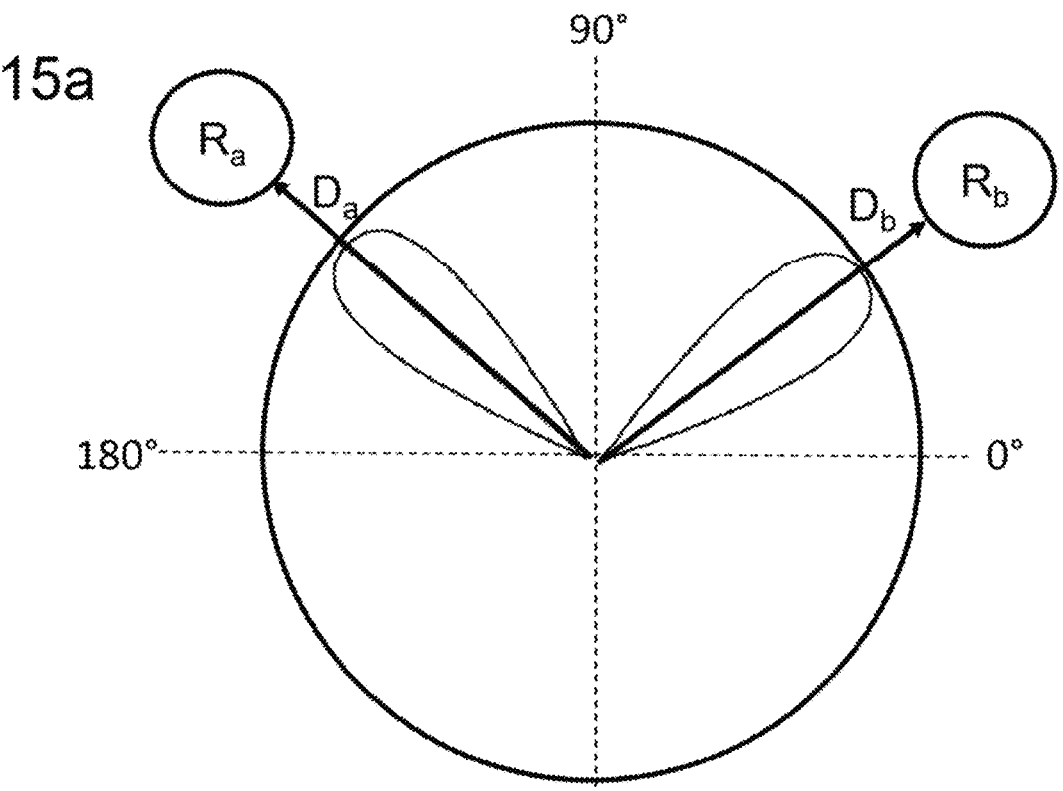
FIG. 15a is a plan view of directional patterns generated by an audio processor of the augmented reality system of FIG. 2 to preferentially receive sound from two objects having a first orientation relative to the end user.
Figure 15B:
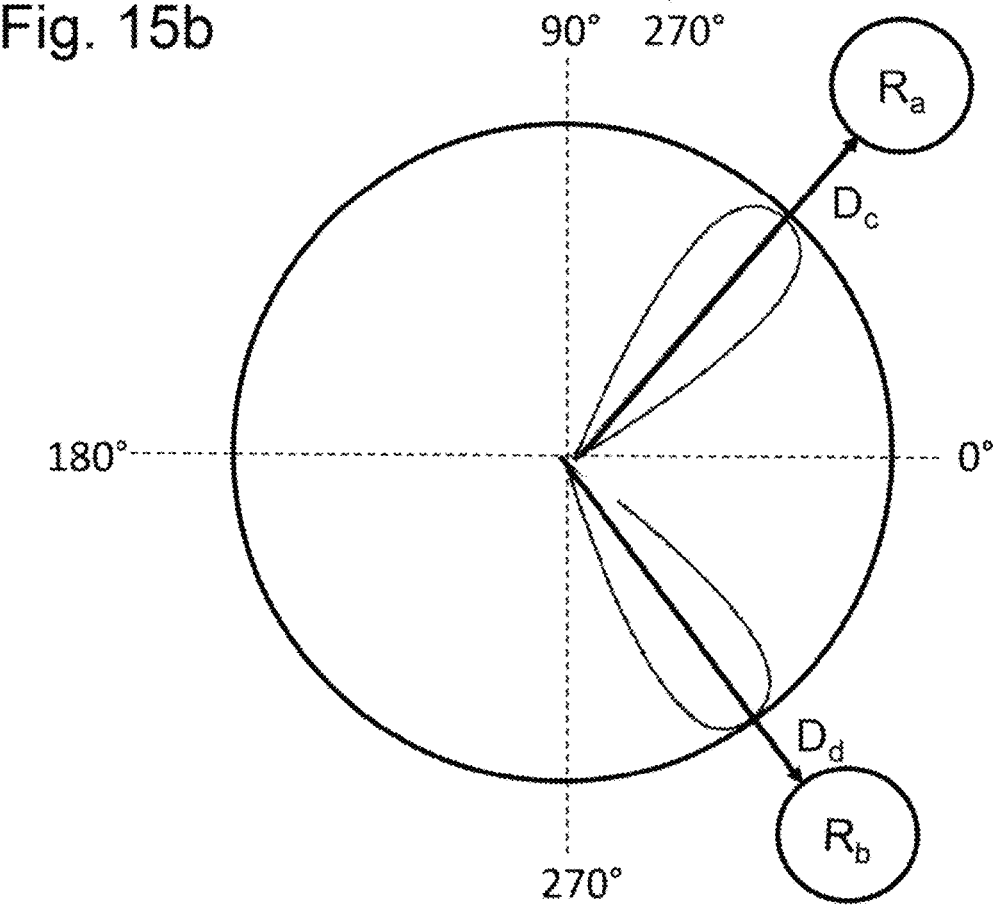
FIG. 15b is a plan view of directional patterns generated by an audio processor of the augmented reality system of FIG. 2 to preferentially receive sound from the two objects having a second orientation relative to the end user.

For example, with reference to FIG. 15a, if two real objects $R_a$ and $R_b$ respectively along two particular directions $D_a$ and $D_b$ are selected, the DSP 182 will generate two instances of the audio processing modules 200, and within each of these audio processing modules 200, select the respective delay factors and gain factors for all of the delay elements 194 and gain elements 196 in each audio processing module 200, such that a receipt gain pattern having two lobes aligned with the directions $D_a$ and $D_b$ of the real objects $R_a$ and $R_b$ is generated. If the orientation of the real objects $R_a$ and $R_b$ relative to the head 54 of the end user 50 changes, the particular directions of the real objects Ra and Rb may change, in which case, the DSP 182 may select different delay factors and gain factors for all of the delay elements 194 and gain elements 196 in each audio processing module 200, such that the receipt gain pattern has two lobes aligned with directions $D_c$ and $D_d$, as illustrated in FIG. 15b.

To facilitate such dynamic modification of the directionality of the audio output AUD-OUT MIC, different sets of delay/gain values and the corresponding preferential directions may be stored in memory 130 for access by the DSP 182. That is, the DSP 182 matches the direction of each selected real object R with the closest directional value stored in memory 130, and selects the corresponding set of delay/gain factors for that selected direction.

It should be noted that although the microphone elements 118 are described as being digital, the microphone elements 118 may alternatively be analog. Furthermore, although the delay elements 194, gain elements 196, and summer 198 are disclosed and illustrated as being software components that reside within the DSP 182, any one or more of the delay elements 194, gain elements 196, and summer 198 may comprise analog hardware components that reside outside of, but under control of, the DSP 182. However, the use of software-based audio processing modules 200 allows sound from several distinct real objects to be preferentially received and processed at the same time.

Referring back to FIG. 12, the DSP 182 also receives voice data from the user microphone 122 and combines that with the directional audio output AUD-OUT MIC. In an optional embodiment, the DSP 182 is configured for performing acoustic echo cancellation (AEC) and noise suppression (NS) functions with respect to sounds from the speakers 108 originating from the virtual objects. That is, the microphone assembly 116 may sense sounds emitted by the speakers 108 even though the direction in which the sound is preferentially received may not coincide with the speakers 108. To this end, the spatialized audio data output by the global special effects module 188 into the speakers 108 is also input into the DSP 182, which uses the spatialized audio data to suppress the resulting sounds output by the speakers 108 (considered as noise) into the microphone assembly 116 and cancel any echoes resulting from feedback from the speakers 108 into the microphone assembly 116.

Significantly, the DSP 182 is further configured for sending the directional audio output AUD-OUT MIC and localized meta data (e.g., the location and orientation of the real object from which the directional audio output AUD-OUT MIC originated) to the recorder 132 for storage as audio content data in the memory 130 (shown in FIG. 2). In the exemplary embodiment illustrated in FIG. 11, the localized meta data corresponds to the real object AUD-R2 (i.e., the real vocalist). Thus, the directional audio output AUD-OUT MIC (which preferentially corresponds to the real object AUD-R2) and the corresponding localized meta data MD-R2 is stored in the memory 130, as shown in FIG. 13.

In an optional embodiment, the directional audio output AUD-OUT MIC (which may be spatialized) may be input into the speakers 108 or other speakers for playback to the end user 50. The directional audio output AUD-OUT MIC may be spatialized in the same manner as the spatialized audio data originating from virtual sources to make it appear to the end user 50 that the sounds are originating from the locations of the real objects, so as to affect clarity or realism of the sound. That is, the localized meta data (e.g., the location and orientation of the real object from which the directional audio output AUD-OUT MIC preferentially originated) may be applied to the directional audio output AUD-OUT MIC to obtain spatialized audio data.

In another optional embodiment, the sound originating from a real object or even a virtual object selected by the end user 50 may be profiled. In particular, the DSP 182 may analyze and compare the characteristics of the sound from the selected object to the characteristics of sounds originating from other real objects in order to determine a type of a target sound. The DSP 182 can then, if desired, include all audio data originating from these real objects in the directional audio output AUD-OUT MIC for recording by the recorder 132 into the memory 130 (shown in FIG. 2). For example, if the end user 50 selected any of the musical objects (AUD-V2, AUD-V3, AUD-V4, AUD-R2), the DSP 182 can control the microphone assembly 116 to preferentially sense all musical real objects.

In the illustrated embodiment, the DSP 182 continues to output the directional audio output AUD-OUT MIC to the recorder 130 for recordation in the memory 130 even if the real object 198 selected by the end user 50 moves out of the field of view of the display subsystem 102 (as indicated by the real object tracking data received from the head/object tracking subsystem 120. In an alternative embodiment, the DSP 182 ceases to output the directional audio output AUD-OUT MIC to the recorder 130 for recordation in the memory 130 as soon as the real object 198 selected by the end user 50 moves out of the field of view of the display subsystem 102, and reinitiates output of the directional audio output AUD-OUT MIC to the recorder 130 for recordation in the memory 130 as soon as the real object 198 selected by the end user 50 moves back into the field of view of the display subsystem 102.

In a similar manner that the audio processor 128 (in the illustrated embodiment, the CPU 180 and DSP 182) sends the audio content data originating from the selected virtual objects and real objects (in the exemplary case, audio content data AUD-V2, AUD-V3, and AUD-V4, and AUD-MIC) and the localized meta data (in the exemplary case, MD-V2, MD-V3, MD-V4, and MD-R2) and global meta data (MD-OUT) to the recorder 132 for storage in the memory 130, the video processor 126 may send video content data originating from virtual objects and real objects (in the exemplary case, video content data VID-V2, VID-V3, VID-V4, and VID-R2), as illustrated in FIG. 13. In the case of virtual objects, the video processor 126 simply acquires virtual objects from the 3D database 124 without further processing and sends these virtual objects to the recorder 132 for storage in the memory 130. In the case of real objects, the video processor 126 may extract or "cut off" any of the selected real objects from the video acquired from the camera(s) 112, and stores these real objects as virtual objects in the memory 130. In the exemplary case illustrated in FIG. 11, the video for the real vocalist R2 may be recorded as a virtual object VID-R2. In an optional embodiment, the video processor 126 sends the entire video (including video corresponding to non-selected virtual and real objects) acquired from the camera(s) 112 to the recorder 132 for storage in the memory 130.

The player 134 is configured for playing back the video and/or audio recorded within the memory 130 to a playback user 50' (shown in FIG. 16a), which may be the original end user 50 that recorded the video/audio or a third-party user. The audio/video may be selectively played back by the player 134 in response to commands given by the playback user 50', e.g., voice commands via the user microphone 122. For example, the playback user 50' may turn the virtual audio playback on or off using a "virtual audio on/off" command, or turn the virtual video playback on or off using a "display on/off" command, or turn the real audio playback on or off using a "real-audio on/off" command.

In the illustrated embodiment, the audio processor 128 retrieves the audio content data and meta data (corresponding to the selected virtual and real objects) from the memory 130, renders the spatialized audio from the audio content data and meta data, and conveys the spatialized audio to the player 134 for play back to the playback user 50' via the speakers 108. In the alternative embodiment where the mixed spatialized audio data (instead of content and meta data) is stored, the player 134 may simply acquire the audio data from the memory 130 for play back to the playback user 50' without re-rendering or otherwise further processing the audio data.

Furthermore, in the illustrated embodiment, the video processor 126 retrieves the video content data and meta data (corresponding to the selected virtual and real objects), renders the video from the video content data and meta data, conveys the video to the player 134 for playback to the playback user 50' via the display subsystem 102 in synchrony with the playback of the audio via the speakers 108. Optionally, in the case where all of the video data captured by the camera(s) 112 is stored, the player 134 may simply acquire the video data from the memory 130 for play back to the playback user 50' without rendering or otherwise further processing video data. The augmented reality system 10 may provide the playback user 50' with an option to either play back only the video corresponding to the selected virtual and real objects or play back the full video captured by the camera(s) 112.

In one embodiment, the current head pose of the playback user 50' is not taken into account during playback of the video/audio. Instead, the video/audio is played back to the playback user 50' using the head pose originally detected during the recording of the video/audio data, which will be reflected in the localized meta data stored along with the audio/video content data within the memory 130, or if the mixed spatialized audio is recorded without meta data, the head pose will be reflected within the mixed spatialized audio stored in the memory 130. In this case, the playback user 50' will experience the video/audio in the same manner as that the original end user 50 experienced the video/audio, with the exception that only the audio, and optionally only the video, originating from the virtual and real objects selected by the original end user 50 will be played back. In this case, the playback user 50' may not be immersed in augmented reality, since the head pose of the playback user 50' will be taken into account. Rather, the playback user 50' may experience the audio playback using headset (so audio will not be affected by the environment), or the playback user 50' may experience the audio playback in a quiet room.

In an alternative embodiment, the current head pose of the playback user 50' may be taken into account during playback of the video/audio. In this case, the head pose of the playback user 50' during recording of the video/audio need not to be incorporated into the meta data stored along with the video/audio content data in the memory 130, since the current head pose of the playback user 50' detected during playback will be used to re-render the video/audio data. Instead, the absolute meta data (e.g., the volume and absolute position and orientation of these virtual objects in the 3D scene, as well as space acoustics surrounding each virtual object, including any virtual or real objects in the vicinity of the virtual source, room dimensions, wall/floor materials, etc.) stored in the memory 130 will be localized to the head pose of the playback user 50' using the current head pose of the playback user 50', and then used to render the audio/video. Thus, the playback user 50' will be immersed in augmented reality during playback of the video/audio.

The playback user 50' may experience the augmented reality in the original spatial environment in which the video/audio was recorded (e.g., the "same physical room") or may experience the augmented reality in a new physical or virtual spatial environment (e.g., a "different physical or virtual room").

If the augmented reality is experienced by the playback user 50' in the original spatial environment in which the video/audio was recorded, the absolute meta data associated with the selected objects need not be modified for accurate playback of the spatialized audio. In contrast, if the augmented reality is experienced by the playback user 50' in a new spatial environment, the absolute meta data associated with the objects may need to be modified for accurate rendering of the audio/video in the new spatial environment.

Figure 16A:
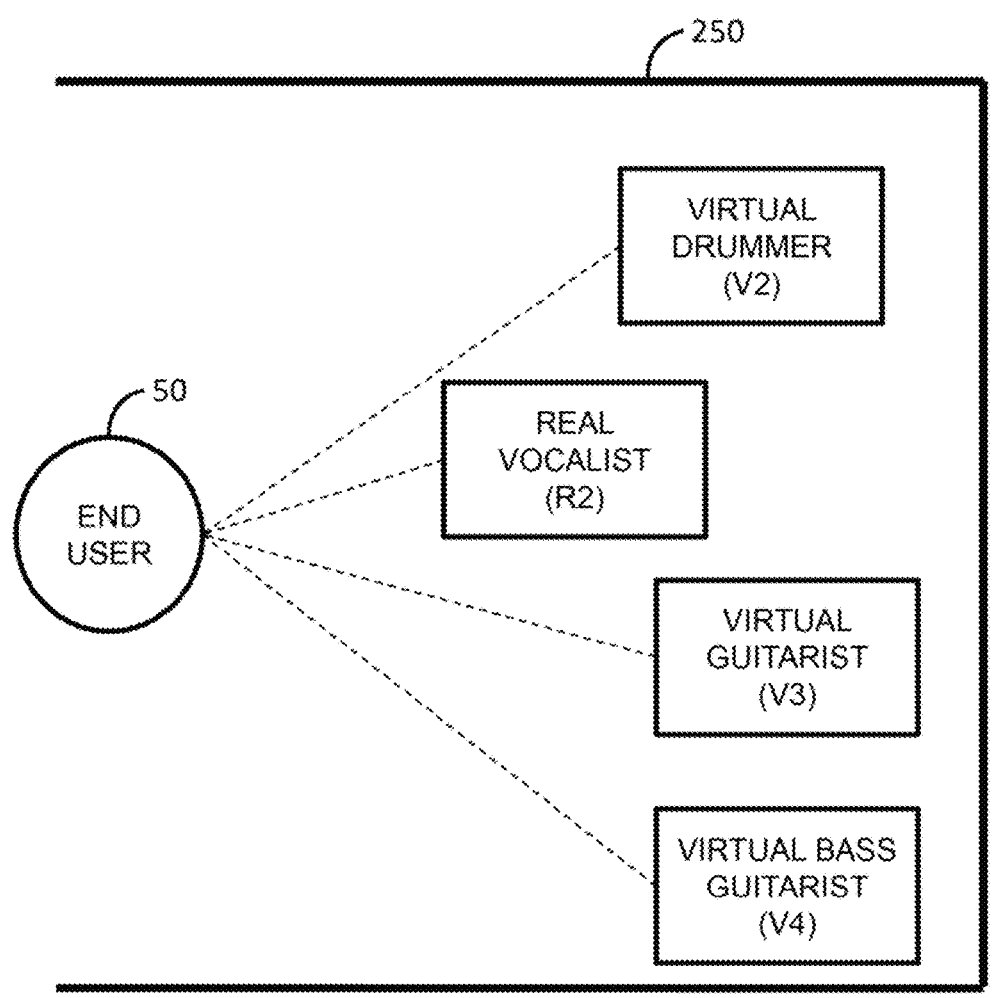
FIG. 16a is a block diagram of objects distributed in an original spatial environment relative to the end user.
Figure 16B:
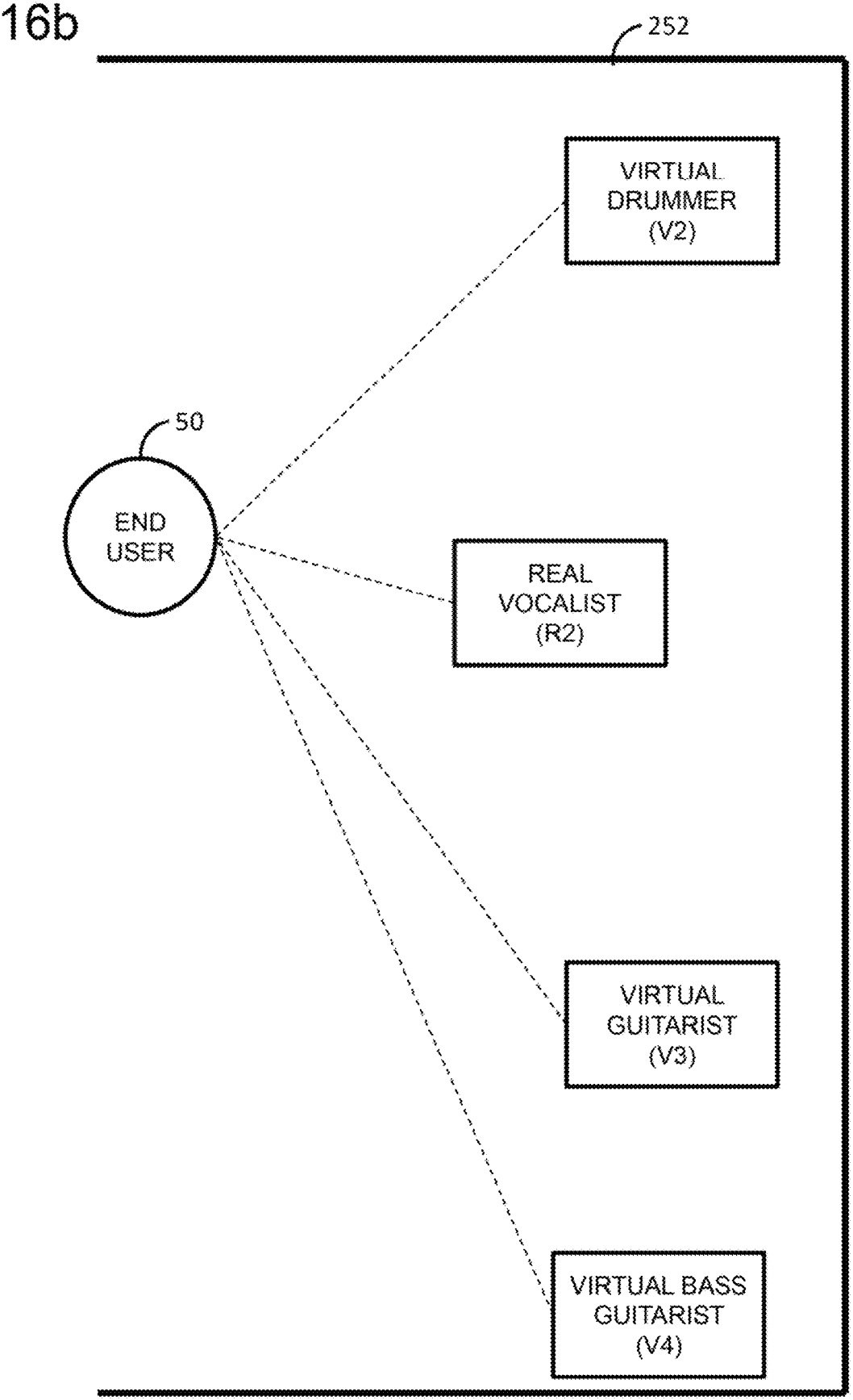
FIG. 16b is a block diagram of the objects of FIG. 17a distributed in a new spatial environment relative to the end user.

For example, in the exemplary embodiment, the audio/video content from the virtual objects AUD-V2 (i.e., virtual drummer), AUD-V3 (i.e., the virtual guitarist), AUD-V4 (i.e., virtual bass guitarist), and real object (i.e., real vocalist) may be recorded in a small room 250, as illustrated in FIG. 16a. The previously recorded audio from the virtual objects AUD-V2 (i.e., virtual drummer), AUD-V3 (i.e., the virtual guitarist), AUD-V4 (i.e., virtual bass guitarist), and real object (i.e., real vocalist) may be played back in a concert hall 252, as illustrated in FIG. 16b. The augmented reality system 10 may reposition the objects anywhere in the concert hall 252, and absolute meta data including the new positions of each object in the concert hall 252, as well as the space acoustics surrounding each object in the concert hall 252, may be generated or otherwise acquired. This absolute meta data can then be localized using current head pose of the playback user 50', and then used to render the audio and video in the concert hall 252 for playback to the playback user 50'.

Figure 17:
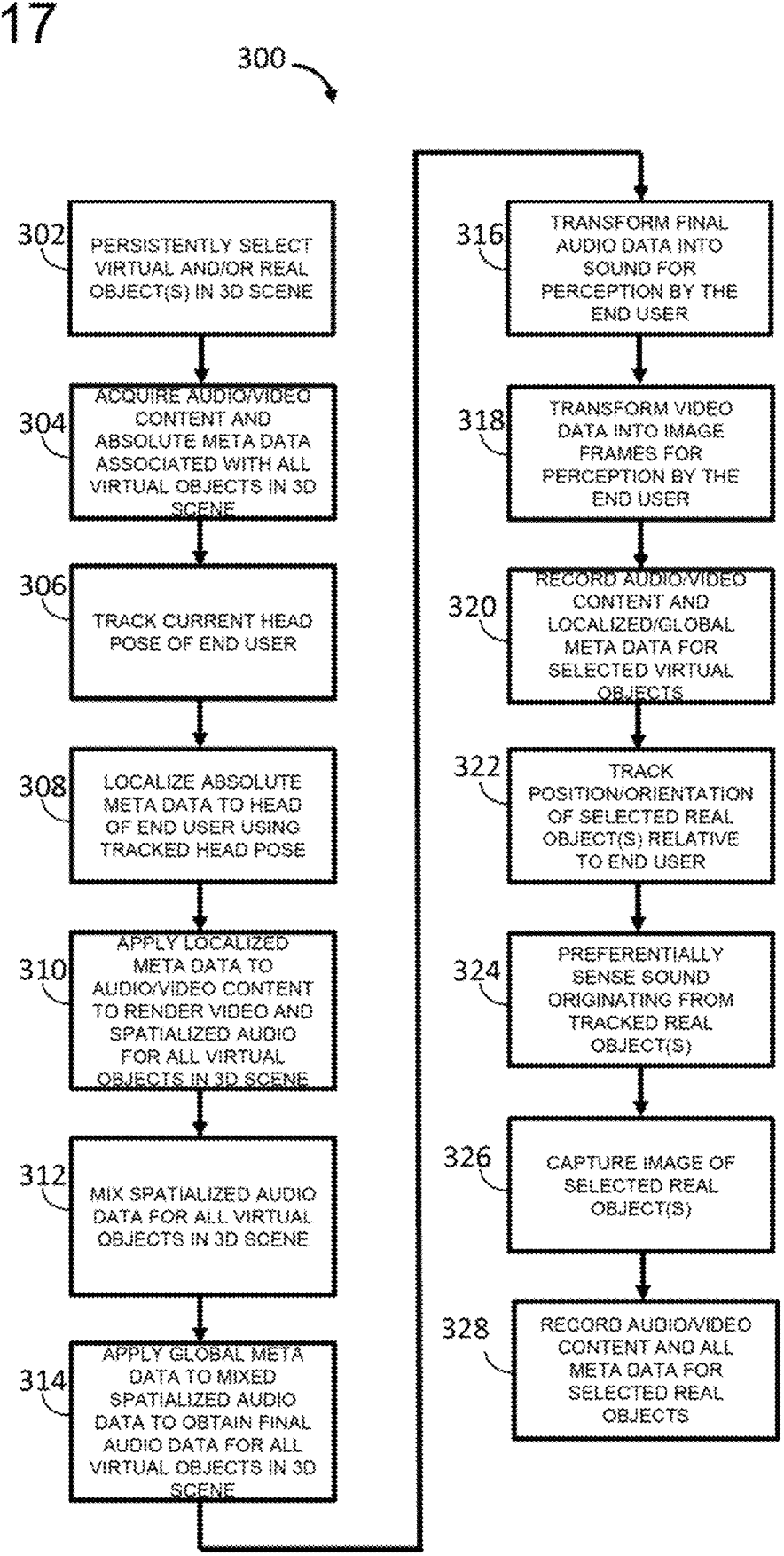
FIG. 17 is a flow diagram illustrating one method of operating the augmented reality system of FIG. 2 to select and record audio and video of virtual and real objects.

Having described the arrangement and function of the augmented reality system 100, one method 300 of using the augmented reality system 100 to select at least one object and record audio and video from these selected object(s) will now be described with respect to FIG. 17.

First, the end user 50 persistently selects at least one object (e.g., real and/or virtual) in a spatial environment via the object selection device 110 (step 302). The object(s) can be selected in the field of view 60 of the end user 50, e.g., by moving a three-dimensional cursor 62 in the field of view 60 of the end user 50 and selecting the object(s) with the three-dimensional cursor 62 (shown in FIG. 5). Or, the object(s) can be selected using hand gestures (shown in FIG. 6 or 7) or using voice commands. Multiple objects may be individually selected, or may be globally selected, e.g., by drawing a line 64 around the objects (shown in FIG. 8) or by defining an angular range 66 of the field of view 60 of the end user 50 (which may be less than the entire angular range of the field of view 60 of the end user 50), and selecting all of the objects in the defined angular range 66 of the field of view 60 of the end user 50 (shown in FIG. 9).

Next, the audio and video content for all virtual objects within the spatial environment, as well as the absolute meta data associated with the virtual objects, are acquired (step 304). Next, current head pose of the end user 50 is tracked (step 306), and the absolute meta data is localized to the head 54 of the end user 50 using the current head pose data (step 308), and applied to the audio and video content of the virtual objects to obtain video data and spatialized audio data for all of the respective virtual objects (step 310). The spatialized audio data for all of the respective virtual objects in the 3D scene are mixed (step 312), and global meta data is applied to the mixed spatialized audio data to obtain final spatialized audio for all virtual objects in the 3D scene (step 314), which is then transformed into sound for perception by the end user 50 (step 316). Next, the video data obtained at step 310 is transformed into image frames for perception by the end user 50 (step 318). Next, the audio/video content and all associated meta data (both absolute and localized meta data) for all virtual object(s) selected by the end user 50 at step 302 are recorded (step 320).

In parallel with steps 304-320, the position and/or orientation of the selected real object(s) relative to the head 54 of the end user 50 is tracked (step 322), and sound originating from the selected real object(s) is preferentially sensed based on the tracked position and orientation of the real object(s) (step 324). Next, images of the selected real object(s) are captured (step 326), and optionally transformed into virtual video content. Next, the audio content associated with the preferentially sensed sound from the selected real object(s) and the video content associated with the captured images of the selected real object(s), as well as all associated meta data (location and orientation of the real object(s)), for each of the selected real object(s) are recorded (step 328).

Figure 18:
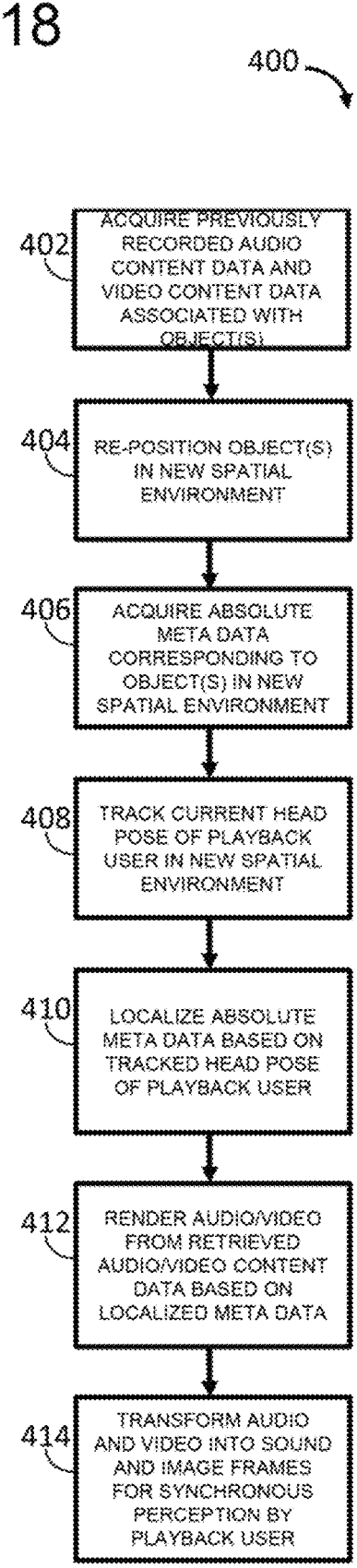
FIG. 18 is a flow diagram illustrating one method of operating the augmented reality system of FIG. 2 to playback the audio and video recorded in FIG. 17 in a new spatial environment.

One method 400 of using the augmented reality system 100 to play back previously recorded audio and video of at least one object to a playback user 50' will now be described with respect to FIG. 18. Such audio and video may have been previously recorded as audio content data and video content data in the manner described above in the method 300 of FIG. 17. The object(s) may be real and/or virtual, and may have been persistently selected by the end user 50. In the exemplary method 400, the audio and video has been previously recorded in an original spatial environment, such as a small room 250, and playback in a new spatial environment different from the original spatial environment, such as a concert hall 252, as described with respect to FIGS. 16a and 16b.

First, the previously recorded audio content data and video content data is acquired (step 402). If the new spatial environment is at least partially virtual, additional virtual content (either audio or video) associated with the new spatial environment may also be acquired. Then, the object(s) are re-positioned within the new spatial environment, which may be in response to input from the playback user 50' (step 404). Then, absolute meta data corresponding to the object(s) positioned in the new spatial environment is acquired (step 406), the head pose of the playback user 50' is tracked in the new spatial environment (step 408), and the absolute meta data is localized to the playback user 50' based on the tracked head pose of the playback user 50' (step 410). Next, the audio and video is rendered from the retrieved audio content data and video content data based on the localized meta data in the new spatial environment (step 412). The rendered audio and video are then respectively transformed into sound and image frames for synchronous perception by the playback user 50' (step 414).

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of operating a virtual image generation system by an end user, comprising:
   persistently selecting at least one object from a field of view of the end user that includes both virtual and real objects;
   generating video data originating from the at least one selected object;
   rendering a plurality of image frames in a three-dimensional scene from the generated video data;
   displaying the image frames to the end user;
   generating audio data originating from the at least one selected object; and
   storing the audio data originating from the at least one selected object in synchronization with stored video data, within memory.

2. The method of claim 1, further comprising transforming the audio data originating from the at least one selected object into sound for perception by the end user.

3. The method of claim 1, wherein the persistently selecting the at least one object comprises moving a three-dimensional cursor in the field of view of the end user and selecting the at least one object with the three-dimensional cursor.

4. The method of claim 1, wherein said persistently selecting at least one object comprises issuing one or more voice commands.

5. The method of claim 1, wherein said persistently selecting at least one object comprises persistently selecting at least a real object.

6. The method of claim 1, wherein the at least one object comprises a plurality of objects, and persistently selecting the plurality of objects comprises individually selecting the objects.

7. The method of claim 1, wherein the at least one selected object comprises a virtual object and the method further comprising:
   storing content data corresponding to sounds for a plurality of virtual objects;
   acquiring the content data corresponding to the selected virtual object, wherein the audio data stored in the memory comprises the acquired content data; and
   generating meta data corresponding to the selected virtual object, wherein the audio data stored in the memory comprises the acquired content data and the generated meta data.

8. The method of claim 7, wherein the meta data includes position, orientation and volume data for the selected virtual object.

9. The method of claim 7, further comprising:
   tracking a head pose of the end user; and
   storing absolute meta data for the plurality of virtual objects;
   wherein generating the meta data comprises retrieving the absolute meta data corresponding to the selected virtual object, and localizing the absolute meta data to the end user based on the tracked head pose of the end user.

10. The method of claim 1, further comprising retrieving the stored audio data, deriving audio from the retrieved audio data, and transforming the audio into sound for perception by the end user.

11. The method of claim 1, wherein the stored audio data comprises content data and meta data, the method further comprising:
    retrieving the stored content data and meta data from the memory;
    rendering spatialized audio based on the retrieved content data and meta data; and
    transforming the spatialized audio into sound for perception by the end user.

12. The method of claim 1, wherein the persistently selecting the at least one object comprises the end user forming a circle or partial circle around the object using at least two fingers.

13. The method of claim 1, further comprising storing audio content data and video content data originating from the at least one selected object when the at least one selected object includes a real object and a virtual object in an original spatial environment;
    retrieving the audio content data and video content data; and
    rendering audio and video from the retrieved audio content data and video content data in a new spatial environment different from the original spatial environment.

14. The method of claim 1, wherein said rendering comprises a video processor including a graphics processing unit (GPU) acquiring the video data of the virtual objects from a three-dimensional database and rendering synthetic video frames therefrom, and further comprising a central processing unit (CPU) acquiring video frames of said real objects from a forward-facing camera.

15. The method of claim 1, further comprising providing the field of view that includes both virtual and real objects by providing a partially transparent display screen through which real objects in the ambient environment are seen by the end user and onto which images of virtual objects are displayed.

16. A method of operating a virtual image generation system by an end user, comprising:
    persistently selecting at least one object from a field of view of the end user that includes both virtual and real objects;
    generating video data originating from the at least one selected object;
    rendering a plurality of image frames in a three-dimensional scene from the generated video data;
    displaying the image frames to the end user;
    generating audio data originating from the at least one selected object; and
    storing the audio data originating from the at least one selected object within memory, wherein the at least one object comprises a plurality of objects, and selecting the plurality of objects comprises globally selecting the objects, and
    wherein globally selecting the objects comprises defining an angular range of the field of view of the end user, and selecting all of the objects in the defined angular range of the field of view of the end user.

17. The method of claim 1, further comprising persistently deselecting the at least one previously selected object.

18. A method of operating a virtual image generation system by an end user, comprising:
persistently selecting at least one object from a field of view of the end user that includes both virtual and real objects;
generating video data originating from the at least one selected object;
rendering a plurality of image frames in a three-dimensional scene from the generated video data;
displaying the image frames to the end user;
generating audio data originating from the at least one selected object; and
storing the audio data originating from the at least one selected object within memory; and tracking a location of the at least one selected object relative to the field of view of the end user.

19. The method of claim 18, further comprising ceasing to store the audio data originating from the at least one selected object in the memory when the tracked location of the at least one selected object moves out of the field of view of the end user.

20. The method of claim 18, further comprising continuing to store the audio data originating from the at least one selected object in the memory when the tracked location of the at least one selected object moves out of the field of view of the end user.

21. A method of operating a virtual image generation system by an end user, comprising:
persistently selecting at least one object from a field of view of the end user that includes both virtual and real objects;
generating video data originating from the at least one selected object;
rendering a plurality of image frames in a three-dimensional scene from the generated video data;
displaying the image frames to the end user;
generating audio data originating from the at least one selected object;
storing the audio data originating from the at least one selected object within memory, wherein the at least one selected object comprises a real object; and
preferentially sensing sounds originating from the selected real object relative to sounds originating from other real objects, wherein the audio data is derived from the preferentially sensed sounds.

22. The method of claim 21, further comprising:
capturing video data originating from the selected real object; and
storing the video data in synchronization with the audio data in the memory.

23. The method of claim 22, further comprising transforming the captured video data into virtual content data, and storing the virtual content data in the memory.

* * * * *